US010602556B2

(12) United States Patent
Foster et al.

(10) Patent No.: US 10,602,556 B2
(45) Date of Patent: Mar. 24, 2020

(54) DISPLAYING INFORMATION BASED ON WIRELESS RANGING

(71) Applicant: Apple Inc., Cupertino, CA (US)

(72) Inventors: James H. Foster, Oxford (GB); Duncan R. Kerr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/424,408

(22) Filed: Feb. 3, 2017

(65) Prior Publication Data

US 2017/0228935 A1 Aug. 10, 2017

Related U.S. Application Data

(60) Provisional application No. 62/291,504, filed on Feb. 4, 2016.

(51) Int. Cl.
*H04W 76/14* (2018.01)
*H04W 4/02* (2018.01)
(Continued)

(52) U.S. Cl.
CPC ............ *H04W 76/14* (2018.02); *G01C 21/20* (2013.01); *G06F 1/1626* (2013.01);
(Continued)

(58) Field of Classification Search
CPC .... G06T 19/006; H04W 76/14; H04W 4/023; G06F 3/14
See application file for complete search history.

(56) References Cited

U.S. PATENT DOCUMENTS 7,062,279 B2 * 6/2006 Cedervall ............... H04L 29/06
455/456.1
8,464,184 B1 6/2013 Cook et al.
(Continued)

FOREIGN PATENT DOCUMENTS

JP H1-249778 A 9/1999
JP 2004040806 A 2/2004
(Continued)

OTHER PUBLICATIONS

PCT Patent Application No. PCT/US2017/016478—International Search Report and Written Opinion dated May 12, 2017.
(Continued)

*Primary Examiner* — Ryan R Yang
(74) *Attorney, Agent, or Firm* — Dickinson Wright RLLP

(57) ABSTRACT

A wireless communication device may locate a proximate object in an environment, such as an electronic device or a resource. During this communication technique, the wireless communication device may receive a transmission that includes an identifier associated with the object. The wireless communication device may determine a range and/or a direction of the object from the wireless communication device. For example, the wireless communication device may determine the range and/or the direction, at least in part, using wireless ranging. Next, the wireless communication device may present output information that indicates the range and/or the direction. In particular, the wireless communication device may display a map of a proximate area with an indicator representative of the object shown on the map. Alternatively, the wireless communication device may display an image of the proximate area with the indicator representative of the object on the image.

20 Claims, 13 Drawing Sheets

(51) Int. Cl.

| | | |
|---|---|---|
| *G06F 3/14* | (2006.01) | |
| *G06F 3/01* | (2006.01) | |
| *G06F 1/16* | (2006.01) | |
| *G01C 21/20* | (2006.01) | |
| *G06T 19/00* | (2011.01) | |
| *G08C 17/02* | (2006.01) | |

(52) U.S. Cl.
CPC .......... *G06F 1/1694* (2013.01); *G06F 1/1698* (2013.01); *G06F 3/011* (2013.01); *G06F 3/016* (2013.01); *G06F 3/017* (2013.01); *G06F 3/14* (2013.01); *G06T 19/00* (2013.01); *G08C 17/02* (2013.01); *H04W 4/023* (2013.01); *G08C 2201/32* (2013.01)

(56) References Cited

U.S. PATENT DOCUMENTS

| | | | |
|---|---|---|---|
| 8,665,075 B2 | 3/2014 | Pratt et al. | |
| 9,235,241 B2 | 1/2016 | Newham et al. | |
| 2002/0180604 A1 | 12/2002 | Yamaashi et al. | |
| 2004/0006642 A1 | 1/2004 | Jang et al. | |
| 2004/0203900 A1 | 10/2004 | Cedervall et al. | |
| 2007/0130582 A1 | 6/2007 | Chang et al. | |
| 2008/0152263 A1 | 6/2008 | Harrison | |
| 2009/0167919 A1* | 7/2009 | Anttila ................... | G01C 21/20 348/333.02 |
| 2010/0328201 A1 | 12/2010 | Marvit et al. | |
| 2011/0060652 A1 | 3/2011 | Morton | |
| 2011/0095873 A1 | 4/2011 | Pratt et al. | |
| 2011/0175822 A1 | 7/2011 | Poon et al. | |
| 2011/0310087 A1* | 12/2011 | Wright, Jr. .............. | G06T 13/80 345/419 |
| 2011/0312311 A1 | 12/2011 | Abifaker et al. | |
| 2013/0096575 A1 | 4/2013 | Olson | |
| 2013/0097525 A1* | 4/2013 | Kim ................... | H04M 1/7253 715/748 |
| 2013/0328762 A1 | 12/2013 | McCulloch et al. | |
| 2014/0016821 A1* | 1/2014 | Arth ................... | G06K 9/00671 382/103 |
| 2014/0320274 A1 | 10/2014 | De Schepper et al. | |
| 2014/0337732 A1 | 11/2014 | Bevilacqua et al. | |
| 2015/0071438 A1* | 3/2015 | Lambert ............... | H04W 76/10 380/255 |
| 2015/0082256 A1 | 3/2015 | Lee et al. | |
| 2015/0088283 A1 | 3/2015 | Fiedler et al. | |
| 2015/0223017 A1 | 8/2015 | Lou et al. | |
| 2016/0205501 A1* | 7/2016 | Lee ....................... | H04W 8/005 455/457 |
| 2016/0224036 A1 | 8/2016 | Baker et al. | |
| 2016/0241910 A1 | 8/2016 | Rowe | |
| 2016/0334880 A1 | 11/2016 | Favre et al. | |
| 2016/0358459 A1 | 12/2016 | Singhar et al. | |
| 2017/0038948 A1* | 2/2017 | Cun ..................... | G01C 21/367 |
| 2017/0147074 A1 | 5/2017 | Buttolo et al. | |
| 2017/0228935 A1 | 8/2017 | Foster et al. | |
| 2018/0103339 A1* | 4/2018 | Roundtree .............. | H04W 4/80 |

FOREIGN PATENT DOCUMENTS

| | | |
|---|---|---|
| JP | 2004320209 A | 11/2004 |
| JP | 2010282401 A | 12/2010 |
| JP | 2011114796 A | 6/2011 |
| JP | 2014123906 A | 7/2014 |
| JP | 2014191367 A | 10/2014 |
| JP | 2015531130 A | 10/2015 |
| KR | 10-2013-0056275 A | 5/2013 |
| WO | 2016005649 A1 | 1/2016 |

OTHER PUBLICATIONS

Australian Patent Application No. 2017214547—Examination Report No. 1 dated Mar. 26, 2019.
European Patent Application No. 17748261.9—Extended European Search Report dated Jul. 9, 2019.
Japanese Patent Application No. 2018-539298—Office Action dated Aug. 26, 2019.
Korean Patent Application No. 10-2018-7021505—Office Action dated Decebmer 26, 2019.

* cited by examiner

DISPLAYING INFORMATION BASED ON WIRELESS RANGING

CROSS-REFERENCE TO RELATED APPLICATION

This application claims the benefit of U.S. Provisional Patent Application No. 62/291,504, entitled "CONTROLLING ELECTRONIC DEVICES BASED ON WIRELESS RANGING," by James H. Foster, filed on Feb. 4, 2016, the contents of which are incorporated by reference herein in their entirety for all purposes.

This application is related to U.S. patent application Ser. No. 15/424,394, entitled "CONTROLLING ELECTRONIC DEVICES BASED ON WIRELESS RANGING", by James H. Foster, filed Feb. 3, 2017, the contents of which are incorporated by reference herein in their entirety for all purposes.

FIELD

The described embodiments relate to wireless communications among electronic devices and user interfaces, including systems and techniques for displaying physical or augmented reality information on a user interface based, at least in part, on wireless ranging.

BACKGROUND

The usefulness and, therefore, the popularity of many electronic devices, including portable electronic devices (such as cellular telephones), is often gated by ease of use. In particular, the ease of use of many electronic devices is typically determined by the user interface. The user interface is the gateway through which users' actions or behaviors are defined and received, including user attempts to access the features of an electronic device. Consequently, the user interface is integral to an overall user experience.

However, there are limitations associated with existing user interfaces. For example, many existing user interfaces, especially those in small, handheld electronic devices, are constrained by their size. In addition, it can be difficult to present information on a user interface in a way that allows different types of information to be intuitively distinguished from each other. Consequently, the amount of information that can be displayed on a user interface is often restricted, and users are often confused by the information that is displayed. In addition to frustrating the users and degrading the user experience, there is often a significant opportunity cost associated with information that is overlooked or that is not displayed.

SUMMARY

Embodiments that relate to a wireless communication electronic device that locates an object are disclosed. During operation, the wireless communication device receives a transmission with an identifier associated with the object located proximate to the wireless communication device in an environment. The wireless communication device determines a range of the object from the wireless communication device and/or a direction to the object, where the range, the direction, or both is determined, at least in part, using wireless ranging. Next, the wireless communication device presents output information that indicates the range and/or the direction.

For example, presenting the output information may involve displaying, on a display in the wireless communication device, a map (or other representation) of a proximate area in the environment and displaying a first indicator representative of the object on the map. Alternatively or additionally, presenting the output information may involve displaying, on the display, an image of the proximate area in the environment captured by an imaging sensor in the wireless communication device and displaying a second indicator representative of the object on the image. In some embodiments, presenting the output information involves transitioning, based on an orientation of the wireless communication device, between displaying, on the display, the map of the proximate area in the environment including the first indicator representative of the object, and displaying, on the display, a camera-captured image of the proximate area including the second indicator corresponding to the object. Note that the first indicator and/or the second indicator may be displayed whether or not the object is within visual range of, or otherwise visible to, the wireless communication device.

Moreover, the identifier associated with the object may be a unique identifier. Furthermore, the identifier associated with the object may be associated with a resource class corresponding to the object. In some embodiments, multiple identifiers having different meanings or different resolvability, can be associated with the same object.

In some embodiments, the wireless communication device compares the received identifier with one or more stored target identifiers to determine a match (e.g., to resolve the identifier). Note that the target identifier may have been received in conjunction with a search result or a transaction. Alternatively or additionally, the target identifier may correspond to a contact maintained by the wireless communication device.

Moreover, the wireless communication device may transmit a message to the object based at least in part on the identifier. For example, the message may include an audio message that is transmitted as a beam-formed audio message perceivable substantially only in a location corresponding to the object, where the location is determined based, at least in part on, the range and/or the direction to the object.

Note that the object may be an electronic device associated with an individual. Alternatively or additionally, the object may be a resource in the environment, such as a public (e.g., safety) resource or a private (e.g., commercial) resource.

Furthermore, the output information may include haptic output, which may be presented through the wireless communication device and/or another device.

Other embodiments provide a computer-program product for use with the wireless communication device. This computer-program product includes instructions for at least some of the operations performed by the wireless communication device.

Still other embodiments provide a method that includes one or more of the operations performed by the wireless communication device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for locating an object, e.g., through wireless ranging. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
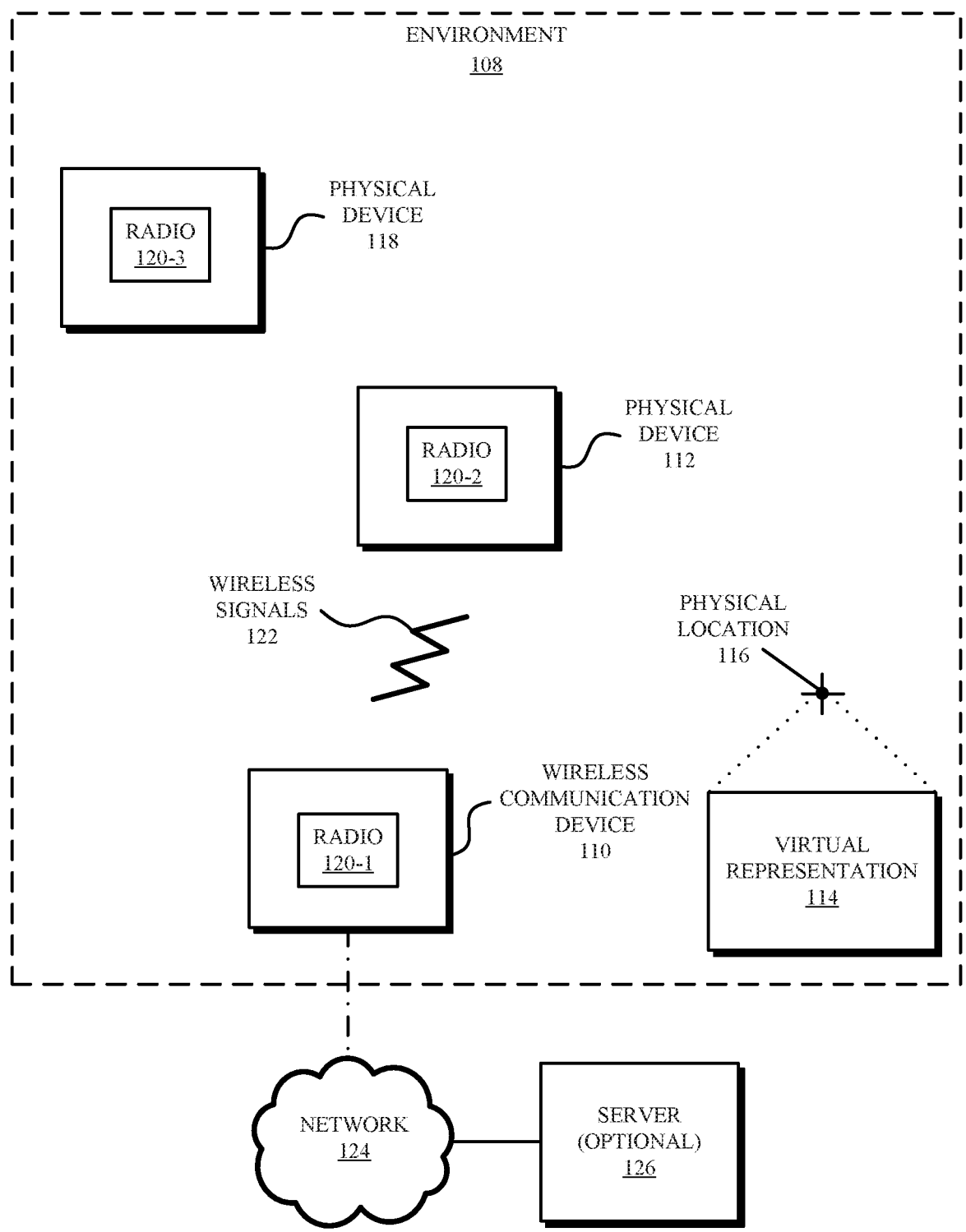
FIG. 1 is a block diagram illustrating an example of electronic devices communicating wirelessly.

The disclosed embodiments relate to a wireless communication device (such as a smartphone or a smart watch) that uses one or more measurements (such as wireless ranging or radio-based distance measurements) to locate a proximate object in an environment, such as a physical device (e.g., an electronic device or a resource) or a virtual representation (or placeholder) of a physical device at a physical reference location. The virtual representation can be a physical object (e.g., a placeholder object) or an entirely virtual object (e.g., one or more coordinates corresponding to a location). The wireless communication device may implement a user-interface technique in which an identifier associated with the object is received wirelessly and one or more measurements are used to wirelessly (e.g., from a distance and, in general, without physical contact) determine a range of the object from the wireless communication device and/or a direction to the object (e.g., a vector or a heading). Then, the wireless communication device may present output information that indicates the range and/or the direction. For example, the wireless communication device may display a map of a proximate area in the environment with an indicator representative of the object on the map. Alternatively, the wireless communication device may display an image of the proximate area (e.g., as captured by a camera of the wireless communication device) with the indicator representative of the object on the image.

This user-interface technique may remove the constraints associated with many existing user interfaces. For example, the output information may be displayed according to the range and/or the direction. This may allow the displayed output information to be arranged intuitively, which may allow a user to quickly understand and use what might otherwise be complicated content. Moreover, this user-interface technique may allow the output information to only be displayed when it is useful to the user, so that only the relevant subset of interesting information is displayed at any given time. In particular, the relevant subset can be identified based on situational awareness of the location of proximate objects in the surrounding environment and the user behavior, such as the orientation of the wireless communication device or the direction in which it is pointed. Consequently, the user-interface technique may improve the user experience when using the wireless communication device, and thus may increase customer satisfaction and retention.

Note that the communication used during wireless communication between electronic devices in the user-interface technique may be in accordance with a communication protocol, such as: an Institute of Electrical and Electronics Engineers (IEEE) 802.11 standard (which is sometimes referred to as Wi-Fi). For example, the communication may be used with IEEE 802.11ax, which is used as an illustrative example in the discussion that follows. However, the user-interface technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

In particular, the wireless communication device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the wireless communication device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol.

The wireless communication device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

Thus, in some embodiments, the wireless communication device can act as a communications hub that provides access to a WLAN and/or to a WWAN and, thus, to a wide variety of services that can be supported by various applications executing on the wireless communication device. Thus, the wireless communication device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Wireless ranging can be performed using any standard or proprietary ranging technique, or any combination of standard and/or proprietary ranging techniques. A wireless ranging operation can be performed to determine a distance between devices (e.g., between an initiator and a responder), a direction between devices, or both. For example, a Time of Flight/Time of Arrival (ToF/ToA) can be determined for one or more messages between the devices, which can be used to establish a measure of distance. The one or more messages can have any format and can be transmitted using any wireless protocol, e.g., an 802.11 protocol, Bluetooth, etc. In some embodiments, ToF/ToA can be determined using a bi-directional exchange of two or more messages. Also, in some embodiments, one or more messages used to perform ranging can be secured, e.g., by encrypting or otherwise protecting at least a portion of the content. Further, in some embodiments, the direction of the source of one or more wireless signals can be determined using a technique such as Angle of Arrival (AoA). For example, AoA estimation can be performed using multiple receive elements (e.g., elements of an antenna array) to measure the different times (TDOA) and/or different phases (PDOA) of arrival of a signal. Additionally or alternatively, in some embodiments, directionality can be determined by measuring Doppler shifts to establish a frequency difference of arrival (FDOA). Wireless ranging techniques can be applied individually or in combination to perform a single ranging operation. Further, wireless ranging techniques can be applied individually or in combination to perform on-going ranging operations, such as continuous or intermittent ranging, and a history of measurements can be captured and used in performing operations based on range and/or direction.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe embodiments of the user-interface technique. FIG. 1 presents a block diagram 100 illustrating an example of electronic devices communicating wirelessly. In particular, a wireless communication device 110 (such as a smartphone, a laptop computer, a wearable, or a tablet) and physical device 112 may communicate wirelessly. These electronic devices may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Further, there may be a virtual representation 114 at a physical location 116. The virtual representation 114 can correspond to a physical device 118, such that virtual representation 114 functions as a proxy for physical device 118. In this case, wireless communication device 110 may identify and interact with virtual representation 114, but may transmit wireless signals that are received at physical device 118. For example, virtual representation 114 may be associated with a thermostat and an adjustment by wireless communication device 110 of the thermostat may be provided through interaction with virtual representation 114, but received and implemented by an environmental unit, e.g., physical device 118.

Note that physical devices 112 and/or 118 may include: an appliance (such as an oven, a refrigerator, a dish washer or a laundry machine), another electronic device (such as a computer, a laptop, a tablet or a computing device), an entertainment device (such as a television, a display, a radio receiver or a set-top box), an audio device, a projector, a security device (such as an alarm or a lock), a communication device (such as a smartphone), a monitoring device (such as a smoke detector or a carbon-monoxide detector), an environmental control (such as a thermostat, a light switch, or a shade), an accessory (such as a keyboard, a mouse or a speaker), a printer, a wearable device, a home-automation device, a resource in an environment 108 (such as a transportation resource, a shared computing resource, a medical resource, a display resource, a security resource, an accessibility resource or a safety resource), etc. Moreover, virtual representation 114 may be implemented as: a sticker, a picture, a piece of ceramic, a geo-fence, one or more coordinates defining a location, etc. In some embodiments, physical device 118 includes: a light switch, a thermostat, etc.

As described further below with reference to FIG. 2, wireless communication device 110, physical device 112, and/or physical device 118 may include subsystems, such as a networking subsystem, a memory subsystem and a processor subsystem. In addition, wireless communication device 110, physical device 112, and/or physical device 118 may include radios 120 in the networking subsystems. More generally, wireless communication device 110, physical device 112, and/or physical device 118 can include (or can be included within) any electronic devices with networking subsystems that enable wireless communication device 110, physical device 112, and/or physical device 118 to wirelessly communicate with another electronic device. This can include transmitting beacons on wireless channels to enable electronic devices to make initial contact with or to detect each other, followed by exchanging subsequent data/management frames (such as connect requests) to establish a connection (which is sometimes referred to as a 'Wi-Fi connection'), configure security options (e.g., IPSec), transmit and receive packets or frames via the connection, etc.

As can be seen in FIG. 1, wireless signals 122 (represented by a jagged line) are communicated by radios 120-1 and 120-2 in wireless communication device 110 and physical device 112, respectively. For example, wireless communication device 110 and physical device 112 may exchange packets using a Bluetooth protocol in a wireless personal area network (WPAN) or a Wi-Fi protocol in a wireless local area network (WLAN).

In particular, as described further below with reference to FIGS. 3-11, wireless communication device 110 may transmit a frame or a packet that includes a transmission time. When this frame or packet is received by physical device 112, the arrival time may be determined. Based on the product of the time of flight (the difference of the arrival time and the transmission time) and the speed of propagation, the distance between wireless communication device 110 and physical device 112 can be calculated. This distance may be communicated in a subsequent transmission of a frame or a packet from physical device 112 to wireless communication device 110 along with an identifier (such as a unique identifier) of physical device 112 or a user of physical device 112. Alternatively, physical device 112 may transmit a frame or a packet that includes a transmission time and an identifier of physical device 112, and wireless communication device 110 may determine the distance between wireless communication device 110 and physical device 112 based on the product of the time of flight (the difference of a arrival time and the transmission time) and the speed of propagation. Note that this approach for dynamically determining distances between electronic devices that wirelessly communicate is sometimes referred to as 'wireless ranging.' Further, wireless ranging (separately or along with other sensor input, such as a compass, gyroscope and/or accelerometer) can be used to disambiguate control input intent when multiple target devices may be located close to one another or in the same line of sight. A variation on this approach may be used, in which wireless communication device 110 senses gesture input directed at physical location 116 through sensor input (e.g., compass, gyroscope and/or accelerometer) and determines that one or more control signals should be transmitted to an associated device, e.g., physical device 118 associated with virtual representation 114. Similarly, another variation on this approach in which wireless communication device 110 transmits frames or packets that are reflected at physical location 116 may optionally be used to dynamically determine the distance between wireless communication device 110 and virtual representation 114. Thus, wireless ranging may be used by wireless communication device 110 to determine when an object (such as physical device 112 or virtual representation 114) is proximate in environment 108.

While the preceding example illustrated wireless ranging with synchronized clocks in wireless communication device 110 and physical device 112, in other embodiments the clocks are not synchronized. For example, the position of wireless communication device 110 or physical device 112 may be estimated based on the speed of propagation and the time of arrival data of wireless signals 122 at several receivers at different known locations (which is sometimes referred to as 'differential time of arrival') even when the transmission time is unknown or unavailable. More generally, a variety of radiolocation techniques may be used, such as: determining distance based on a difference in the power of the received signal strength indicator (RSSI) relative to the original transmitted signal strength (which may include corrections for absorption, refraction, shadowing and/or reflection); determining the angle of arrival at a receiver (including non-line-of-sight reception) using a directional antenna or based on the differential time of arrival at an array of antennas with known location(s); determining the distance based on backscattered wireless signals; and/or determining the angle of arrival at two receivers having known location (i.e., trilateration or multilateration). Note that wireless signals 122 may include transmissions over GHz or multi-GHz bandwidths to create pulses of short duration (such as, e.g., approximately 1 ns), which may allow the distance to be determined within 0.3 m (e.g., 1 ft.). In some embodiments, the wireless ranging is facilitated using location information, such as a location of one or more of electronic devices in FIG. 1 that are determined or specified by a local positioning system, a Global Positioning System and/or a wireless network.

Moreover, wireless communication device 110 may include one or more sensors that measure (or generate) sensor data. For example, the one or more sensors may include: one or more compasses, one or more accelerometers, and/or one or more gyroscopes that measure an orientation (or an orientation value) or a direction of wireless communication device 110; one or more accelerometers that measures an acceleration of wireless communication device 110; a transceiver (such as radio 120-1) that determines a metric that characterizes wireless communication between wireless communication device 110 and another electronic device (such as physical device 112 or, in embodiments in which reflected wireless signals are received, wireless communication device 110); one or more touch sensors configured to receive touch input, e.g., via a touch screen; and/or one or more microphones or acoustic transducers that measure ambient sound in environment 108 of wireless communication device 110. In some embodiments, wireless communication device 110 determines the proximity of the object in environment 108 using an ultrasonic chirp provided by an acoustic transducer. This ultrasonic chirp may be outside the range of human hearing. In the discussion that follows, 'proximity' of electronic devices should be understood to include at least being within wireless-communication range, and may further restrict the electronic devices to be in the same room or within a predefined distance (such as within 10 m or 30 m).

As described further below with reference to FIGS. 3-11, during the user-interface technique, wireless communication device 110 may use wireless ranging and/or the sensor data to locate the object in environment 108 and to provide intuitive information about the object based on the determined location. In particular, wireless communication device 110 may receive a transmission including an identifier associated with the object (e.g., physical device 112) located proximate to wireless communication device 110 in environment 108 (such as a room in a building or a region surrounding wireless communication device 110). For example, the identifier may be a unique identifier of physical device 112 (and, thus, of a user of physical device 112). Alternatively or additionally, the identifier may be associated with a resource class corresponding to physical device 112, such as: a transportation resource, a shared computing resource (e.g., a printer), a medical resource, a display resource, a security resource, an accessibility resource, a safety resource, etc. Note that the identifier may have been received in conjunction with a search result or a transaction. Alternatively or additionally, the identifier may correspond to a contact of the user of wireless communication device 110. In some implementations, an object (e.g., physical device 112) can separately transmit multiple different identifiers that can be resolved differently depending on the information available to the recipient (e.g., wireless communication device 110).

In response, wireless communication device 110 may compare the received identifier to one or more stored target identifiers to determine a match. Then, using wireless ranging, wireless communication device 110 may determine a range (or distance) of physical device 112 from wireless communication device 110 and/or a direction to physical device 112.

Next, wireless communication device 110 may present output information that indicates the range and/or the direction to physical device 112. For example, as described further below with reference to FIG. 4, wireless communication device 110 may display a map of a proximate area in environment 108 and may display a first indicator representative of physical device 112 on the map. Alternatively or additionally, as described further below with reference to FIG. 5, wireless communication device 110 may display an image of the proximate area in environment 108 captured by an imaging sensor (such as a CMOS or a CCD imaging sensor and, more generally, a camera) in wireless communication device 110 and may display a second indicator (which may be the same as or different than the first indicator) representative of physical device 112 on the image. Note that the first indicator and/or the second indicator may be displayed whether or not physical device 112 is within visual range of, or otherwise visible to, wireless communication device 110.

Figure 6:
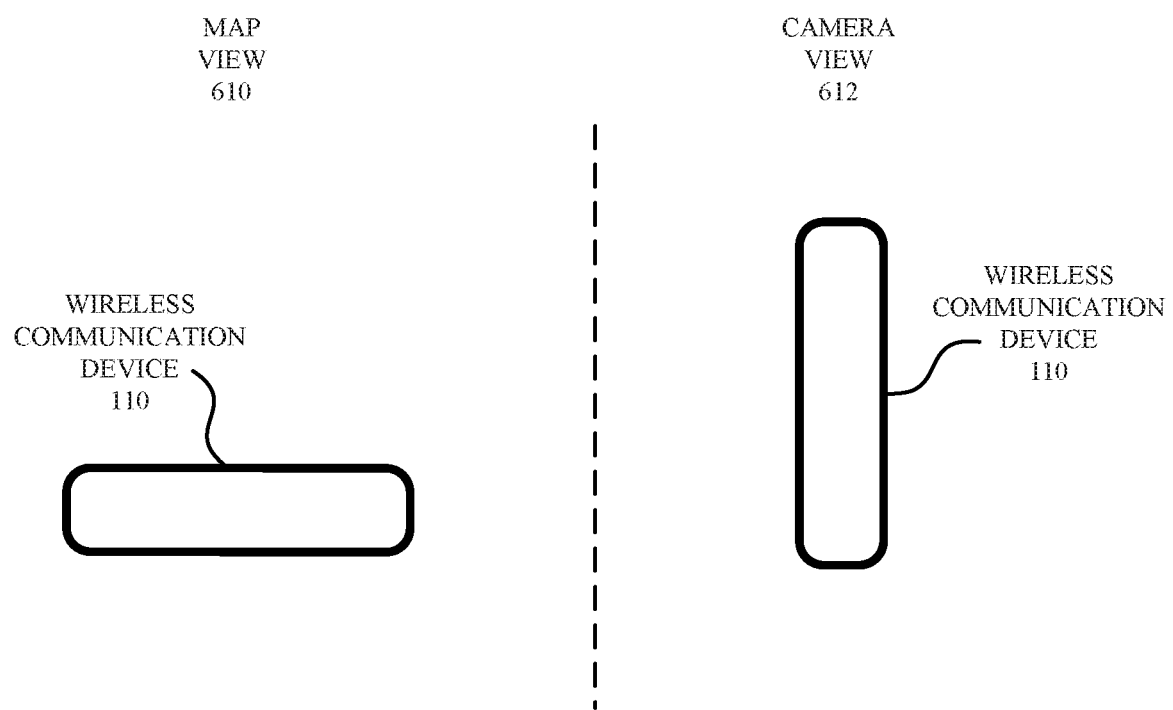
FIG. 6 provides a drawing illustrating an example of different modes of a user interface based on an orientation of a wireless communication device.

Moreover, as described in FIG. 6, in some embodiments a user can intuitively toggle or transition between the two user-interface modes by changing an orientation of wireless communication device 110. In particular, based on a measured orientation value, wireless communication device 110 may selectively transition between displaying the map and displaying the image. Thus, when wireless communication device 110 is facing downward (e.g., horizontally), the map with the first indicator may be displayed, and when wireless communication device 110 faces the direction of physical device 112 (e.g., vertically), the image with the second indicator may be displayed.

Figure 7:
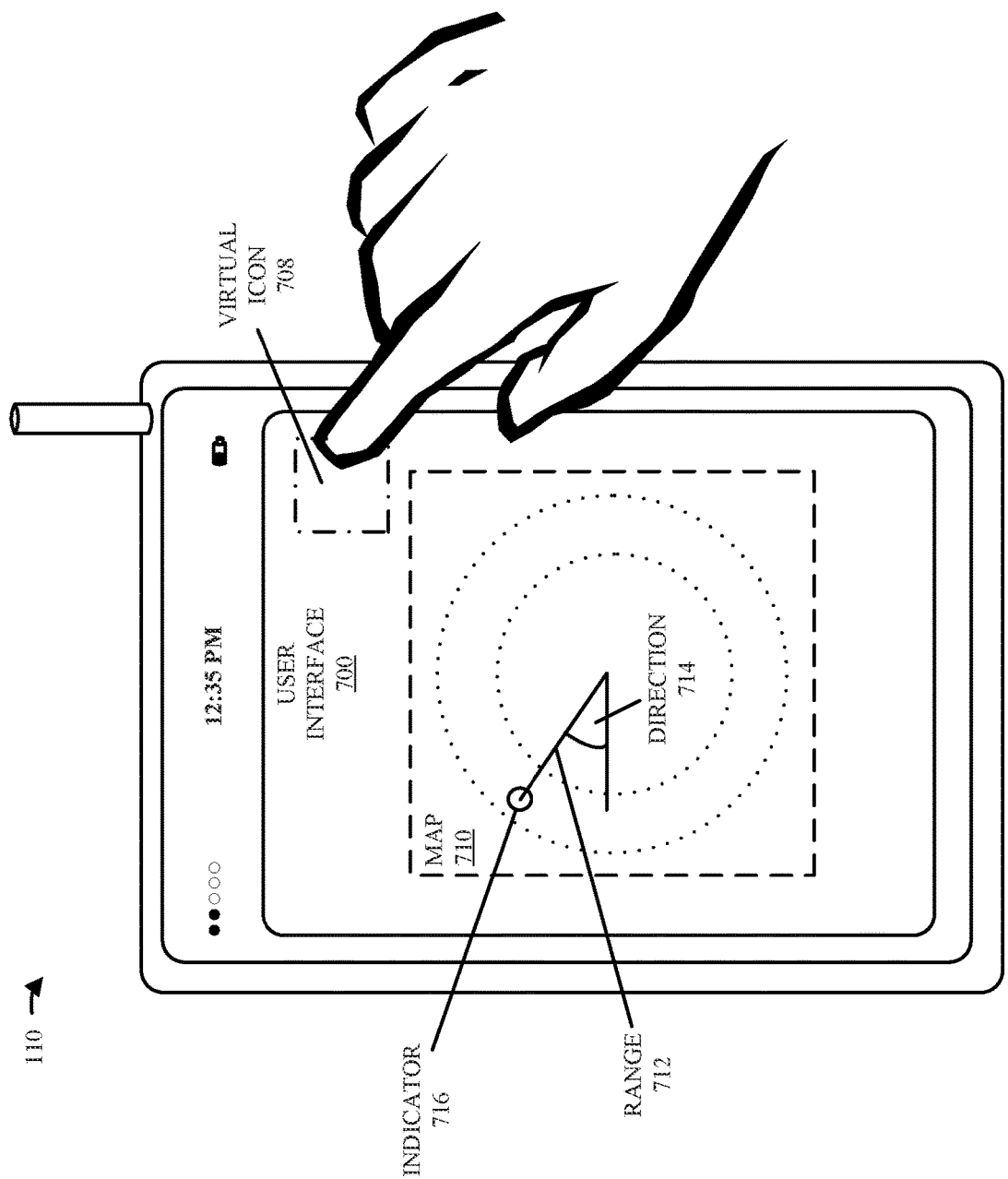
FIG. 7 provides a drawing illustrating an example of different modes of a user interface.

Alternatively, as described in FIG. 7, the user may select a user-interface mode, such as by making and then breaking contact with a touch-sensitive display in wireless communication device 110 within a strike area of an icon. In this way, the user may select a user-interface mode in which a map with a 360° perspective around wireless communication device 110 is displayed, and objects (such as physical device 112) at different ranges and directions are represented on the map by first indicators (such as symbols, emoticons or graphical icons). Furthermore, the user may select a user-interface mode in which the image is displayed, and physical device 112 is represented by the second indicator (such as a symbol, an emoticon or a graphical icon) when wireless communication device 110 is pointed or facing in the direction of physical device 112. In some implementations, one or more other graphical elements (e.g., directional elements) also can be presented while the display of wireless communication device 110 displays an image of the proximate area.

In some embodiments, the user-interface technique includes augmented reality. In particular, as described below with reference to FIG. 8, a front-facing camera on wireless communication device 110 may capture images (or video) of environment 108 that would be masked by wireless communication device 110 when the user holds wireless communication device 110 in front of their face. Then, the images may be displayed on wireless communication device 110 along with indicators that represent objects (such as physical device 112) when wireless communication device 110 is facing the direction of physical device 112, so that wireless communication device 110 appears transparent to the user. Note that the indicators may be positioned in the images at their locations in environment 108 and may be sized to provide a perspective view with intuitive information about the relative ranges to the objects. Therefore, objects that are farther away from wireless communication device 110 (and, thus, from the user) may be represented by smaller indicators than objects that are nearer to wireless communication device 110.

Furthermore, as described below with reference to FIG. 9, the augmented reality may include so-called 'x-ray vision.' In particular, when physical device 112 is located on the other side of an opaque barrier (such as a wall or a piece of furniture), the images displayed on wireless communication device 110 may allow the user to see physical device 112 as if the opaque barrier were not there or as if the user could see through the opaque barrier. For example, if the user is looking for a network printer that is in another room, when the user points wireless communication device 110 in the direction of the network printer, an image of the network printer may be displayed on wireless communication device 110, along with information that allows the user to access the network printer. Thus, by tapping on an icon associated with the network printer in a user interface displayed on wireless communication device 110, the user may instruct wireless communication device 110 to pair or connect with (or otherwise interact with) the network printer. Alternatively or additionally, the user interface may include instructions (and optionally a building map) on how to reach the network printer.

Similarly, as described further below with reference to FIG. 10, the user-interface technique may allow a user to track the location of objects (such as physical device 112) in environment 108 or to obtain reminders about one or more related objects in environment 108 (e.g., to prevent loss). In this way, a parent may keep track of a child or may make sure not to forget something (such as a backpack) on the way to school.

Figure 11:
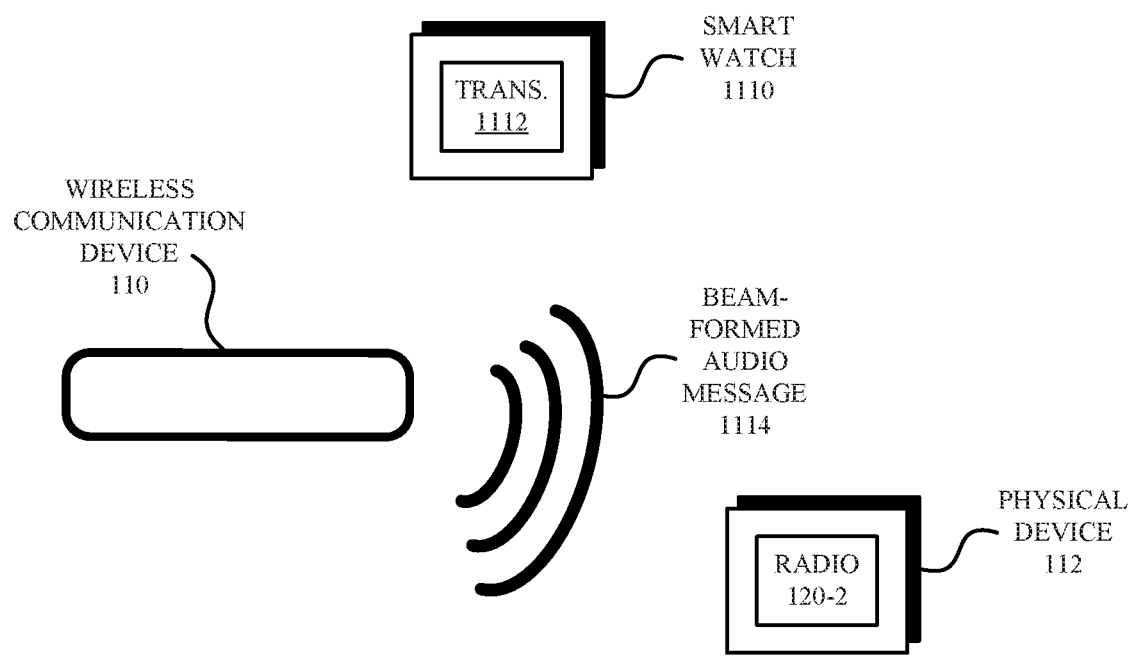
FIG. 11 provides a drawing illustrating an example of different types of feedback associated with a user interface.

Moreover, as described further below with reference to FIG. 11, a wide variety of feedback may be provided to the user or other individuals in environment 108 using the user-interface technique. In addition to the visual information described previously, wireless communication device 110 may provide haptic feedback to a user, either directly on wireless communication device 110 or indirectly through another electronic device (such as the user's smart watch). In this way, the user may receive feedback about their environment, such as when they are facing in the direction of physical device 112.

Additionally, wireless communication device 110 may transmit a message to physical device 112, such as a text or an audio message. For example, the message may include an audio message that is transmitted as a beam-formed audio message that is perceivable substantially only in a location corresponding to physical device 112 (e.g., a private audio broadcast). In this way, the user of wireless communication device 110 can send private messages to another individual that is within range, even when the user does not have an electronic way to communicate with the other individual (such as when the user does not know the recipient's telephone number or email address). Additionally or alternatively, wireless communication device 110 may transmit a beam-formed audio message to the user with relevant information, such as: the name of a person in environment 108, a task to accomplish, an upcoming appointment, etc.

Thus, the user-interface technique may allow wireless communication device 110 to control an object (or functionality associated with an object) from a distance, including without the user opening or unlocking wireless communication device 110. The user-interface technique may also allow wireless communication device 110 to provide situational awareness about objects in environment 108 in an intuitive and useful manner. These capabilities may also provide the user new degrees of freedom in controlling or interacting with the object in environment 108. Consequently, the user-interface technique may improve the user experience when using wireless communication device 110, and thus may increase user satisfaction and retention.

In the described embodiments, processing a packet or frame in one of wireless communication device 110, physical device 112, and/or physical device 118 includes: receiving wireless signals 122 encoding the packet or frame; decoding/extracting the packet or frame from received wireless signals 122 to acquire the packet or frame; and processing the packet or frame to determine information contained in the packet or frame (such as data in the payload).

In general, the communication via the WLAN in the user-interface technique may be characterized by a variety of metrics (or communication-performance metrics). For example, the metric may include: an RSSI, a data rate, a data rate for successful communication (which is sometimes referred to as a 'throughput'), an error rate (such as a retry or resend rate), a mean-square error of equalized signals relative to an equalization target, inter-symbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers or types of electronic devices may be present. For example, some embodiments include more or fewer electronic devices. As another example, in another embodiment, different electronic devices can be transmitting and/or receiving packets or frames.

We now describe embodiments of an electronic device. FIG. 2 presents a block diagram of an example of electronic device 200 (which may be a portable electronic device or a station). For example, electronic device 200 may be one of: wireless communication device 110, physical device 112, and/or physical device 118 in FIG. 1. Electronic device 200 may include processing subsystem 210, memory subsystem 212, networking subsystem 214, display subsystem 226, measurement subsystem 230, and user-interaction subsystem 232. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

Memory subsystem 212 includes one or more devices for storing data and/or instructions for processing subsystem 210 and networking subsystem 214. For example, memory subsystem 212 can include dynamic random access memory (DRAM), static random access memory (SRAM), a read-only memory (ROM), flash memory, and/or other types of memory. In some embodiments, instructions for processing subsystem 210 in memory subsystem 212 include: one or more program modules or sets of instructions (such as program module 222 or operating system 224), which may be executed by processing subsystem 210. For example, a ROM can store programs, utilities or processes to be executed in a non-volatile manner, and DRAM can provide volatile data storage, and may store instructions related to the operation of electronic device 200. Note that the one or more computer programs may constitute a computer-program mechanism or software. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210. In some embodiments, the one or more computer programs are distributed over a network-coupled computer system so that the one or more computer programs are stored and executed in a distributed manner.

In addition, memory subsystem 212 can include mechanisms for controlling access to the memory. In some embodiments, memory subsystem 212 includes a memory hierarchy that includes one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Figure 2:
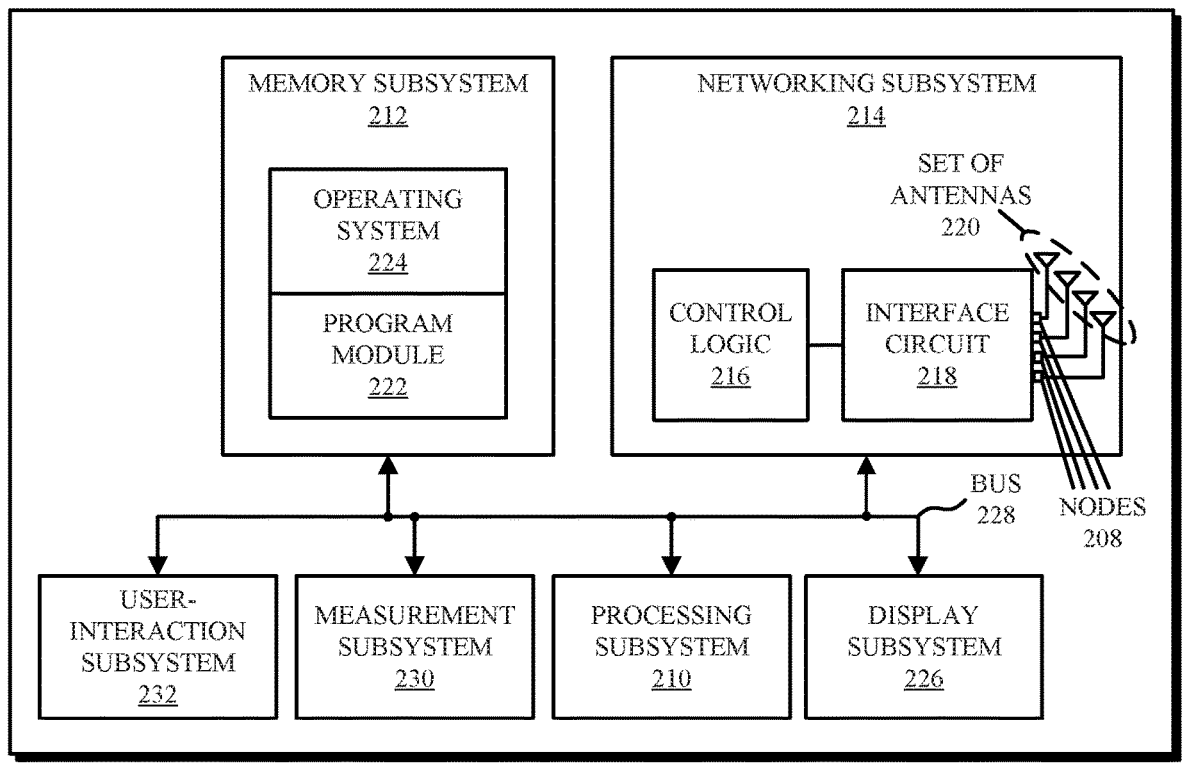
FIG. 2 provides a block diagram illustrating an example of a wireless communication device that performs wireless ranging.

Networking subsystem 214 includes one or more devices configured to couple to and communicate on a wired and/or wireless network (i.e., to perform network operations), including: control logic 216, an interface circuit 218 and a set of antennas 220 (or antenna elements) in an adaptive array that can be selectively turned on and/or off by control logic 216 to create a variety of optional antenna patterns or 'beam patterns.' (While FIG. 2 includes set of antennas 220, in some embodiments electronic device 200 includes one or more nodes, such as nodes 208, e.g., a pad, which can be coupled to set of antennas 220. Thus, electronic device 200 may or may not include set of antennas 220.) For example, networking subsystem 214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 200 may use the mechanisms in networking subsystem 214 for performing simple wireless communication between the electronic devices, e.g., transmitting advertising or beacon frames and/or scanning for advertising frames transmitted by other electronic devices.

Within electronic device 200, processing subsystem 210, memory subsystem 212, networking subsystem 214, display subsystem 226, measurement subsystem 230, and user-interaction subsystem 232 are coupled together using bus 228 that facilitates data transfer between these components. Bus 228 may include an electrical, optical, and/or electro-optical connection that the subsystems can use to communicate commands and data among one another. Although only one bus 228 is shown for clarity, different embodiments can include a different number or configuration of electrical, optical, and/or electro-optical connections among the subsystems.

In some embodiments, electronic device 200 includes a display subsystem 226 for displaying information on a display, which may include a display driver and the display, such as a liquid-crystal display, a multi-touch touchscreen, etc. Display subsystem 226 may be controlled by processing subsystem 210 to display information to a user (e.g., information relating to incoming, outgoing, or an active communication session). In some embodiments, display subsystem 226 can be configured to generate display information for non-native displays (e.g., displays associated with other devices).

Electronic device 200 can also include a measurement subsystem 230 with one or more sensors that allows electronic device 200 to perform one or more type of measurements. For example, the one or more sensors may include: one or more compasses, one or more accelerometers, one or more gyroscopes, one or more microphones or acoustic transducers, one or more environmental sensors (such as a temperature sensor and/or an altimeter), one or more light sensors (such as an ambient light sensor), one or more touch sensors (such as a touchscreen), one or more biometric sensors (such as a fingerprint sensor), etc. Note that the one or more sensors may include physical sensors in electronic device 200 and/or a virtual sensor (such as a sensor implemented, at least in part, in software). In some embodiments, at least some of the one or more sensors determine sensor data based on information received from a remote electronic device.

Moreover, electronic device 200 may include a user-interaction subsystem 232. For example, user-interaction subsystem 232 can include a variety of user-input devices, such as: a button, keypad, dial, touchscreen, audio-input interface, visual/image-capture-input interface, input in the form of sensor data, etc. Alternatively or additionally, user-interaction subsystem 232 may include a variety of user-output devices, such as: one or more speakers (which may provide a directional acoustic array), a haptic transducer, etc.

Electronic device 200 can be (or can be included in) any electronic device with at least one network interface. For example, electronic device 200 may include: a cellular telephone or a smartphone, a tablet computer, a laptop computer, a notebook computer, a personal or desktop computer, a netbook computer, a computing device, a shared computing device (such as a printer), a media player device, an electronic book device, a smart watch, a wearable computing device, a wearable device, a portable computing device, a consumer-electronic device, an access point, a router, a switch, communication equipment or a communication device, test equipment, an appliance, an entertainment device, a television, a display, a radio receiver, a set-top box, an audio device, a projector, a medical device (such as an automated external defibrillator), a security device, an alarm, a monitoring device (e.g., a smoke detector or a carbon-monoxide detector), an environmental control, a thermostat, a light switch, an accessory, a keyboard, a mouse, a speaker, a printer, a home-automation device, a vehicle, an electronic lock, as well as any other type of electronic computing device having wireless communication capability that can include communication via one or more wireless communication protocols.

Although specific components are used to describe electronic device 200, in alternative embodiments, different components and/or subsystems may be present in electronic device 200. For example, electronic device 200 may include one or more additional processing subsystems, memory subsystems, networking subsystems, and/or display subsystems. Additionally, one or more of the subsystems may not be present in electronic device 200. Moreover, in some embodiments, electronic device 200 may include one or more additional subsystems that are not shown in FIG. 2. Also, although separate subsystems are shown in FIG. 2, in some embodiments some or all of a given subsystem or component can be integrated into one or more of the other subsystems or component(s) in electronic device 200. For example, in some embodiments program module 222 is included in operating system 224 and/or control logic 216 is included in interface circuit 218.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 214. This integrated circuit may include hardware and/or software mechanisms that are used for transmitting wireless signals from electronic device 200 and receiving signals at electronic device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the described single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals, e.g., performing wireless ranging, etc.)

In some embodiments, an output of a process for designing the integrated circuit, or a portion of the integrated circuit, which includes one or more of the circuits described herein may be a computer-readable medium such as, e.g., a programmable memory, a magnetic tape, or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

The user-interface technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the user-interface technique may be implemented using program module 222, operating system 224 (such as a driver for interface circuit 218) or in firmware in interface circuit 218. Alternatively or additionally, at least some of the operations in the user-interface technique may be implemented in a physical layer, such as hardware in interface circuit 218. In an exemplary embodiment, the user-interface technique is implemented, at least in part, in a MAC layer in interface circuit 218.

In an exemplary embodiment, the user-interface technique is used to intuitively provide information about one or more objects in an environment control. In particular, when the range and/or direction to an object are determined by a wireless communication device based on one or more measurements (such as wireless ranging and/or orientation), the wireless communication device may use the determined range and/or the direction to intuitively provide output information about the object (such as in a user interface).

Figure 3:
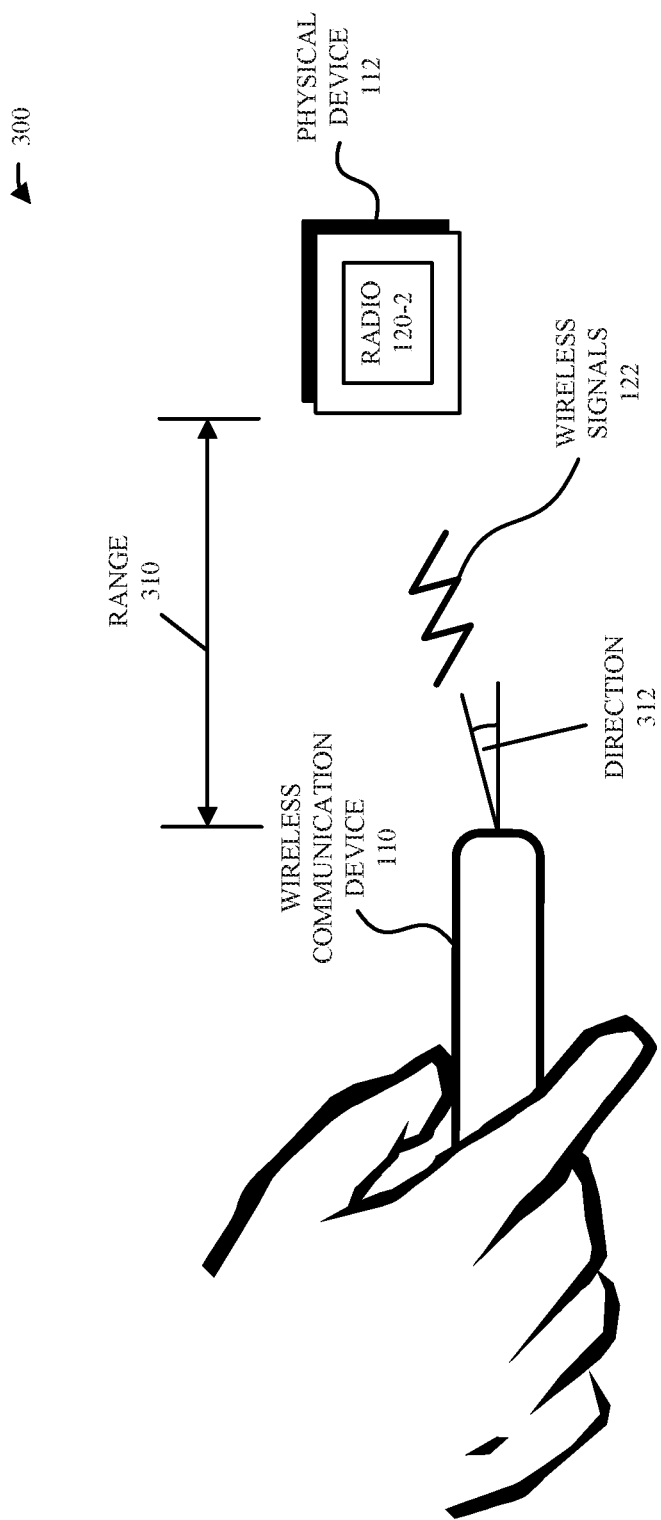
FIG. 3 provides a drawing illustrating an example of locating an object in an environment using wireless ranging.

FIG. 3 presents a drawing 300 illustrating an example of locating an object in an environment using wireless ranging. In particular, physical device 112, which is proximate to wireless communication device 110 in environment 108 in FIG. 1, may transmit a packet (or a frame) with an identifier associated with physical device 112. Then, wireless communication device 110 may receive this transmission including the identifier.

For example, the identifier may be either a generic or a unique identifier of physical device 112 (and, thus, of a user of physical device 112). Alternatively, the identifier may be associated with a resource class corresponding to physical device 112, such as: a transportation resource, a shared computing resource (e.g., a printer), a medical resource, a display resource, a security resource, an accessibility resource or a safety resource. Note that the identifier may have been received in conjunction with a search result or a desired financial transaction (such as when the user wants to purchase a particular item available in proximity to or associated with physical device 112). In particular, if a user of wireless communication device 110 performs a search (e.g., using a search engine) for the resource class and the transmission is received, wireless communication device 110 may, as described further below, display location information related to physical device 112 when the identifier is received. Alternatively or additionally, the identifier may correspond to a contact of the user of wireless communication device 110, such as a friend or colleague of the user (i.e., someone the user already knows), or someone the user is supposed to meet in environment 108 in FIG. 1 (whom the user may or may not know). For example, to facilitate a meeting, either or both of the parties can provide an identifier in advance, for which the respective devices can then monitor.

In some embodiments, the identifier can be associated with persistent contact information for another person (e.g., associated with physical device 112) that is stored on wireless communication device 110 (or that can be accessed in a data structure stored remotely). Then, when this identifier is detected by wireless communication device 110, an indicator can be provided signaling the presence and identity of the person corresponding to the identifier. Alternatively, the identifier may be transient or temporary, such as an identifier assigned by an application executing on wireless communication device 110 or physical device 112. For example, a ride-share application may temporarily assign an identifier to wireless communication device 110, which it can then broadcast. Further, the ride-share application can provide the transient identifier to a device corresponding to an assigned driver (e.g., physical device 112) to facilitate pick-up. Similarly, an identifier (persistent or transient) corresponding to the driver's device can be provided to wireless communication device 110 to verify the driver. A transient identifier may expire after a predetermined amount of time, such as an hour, or upon completion of a transaction. Any number of persistent and transient identifiers can be associated with a device or an object, e.g., to facilitate identification across a variety of scenarios.

Furthermore, the identifier may be varied over time to protect the user's privacy and to provide security. In particular, the identifier may be assigned by a cloud-based server 126 via network 124 in FIG. 1 (such as the Internet), and may be updated periodically (such as after a time interval, e.g., 5 min, has elapsed) or may be a one-time identifier, e.g., associated with a transaction. In some embodiments, the identifier is an anonymous identifier that can be persistently assigned to, e.g., physical device 112. However, the anonymous identifier may be known to one or more contacts, who can resolve the anonymous identifier, e.g., based on a locally stored association. Note that electronic devices may be configured with several identifiers, which can be periodically transmitted. This last capability may be used in one or more of the preceding embodiments.

In response to receiving the identifier, wireless communication device 110 may compare the identifier to one or more stored target identifiers in local (or remote) memory to determine a match. Then, using wireless ranging, wireless communication device 110 may determine a range (or distance) 310 of physical device 112 from wireless communication device 110 and/or a direction 312 to physical device 112. Alternatively or additionally, wireless communication device 110 may determine range 310 and/or direction 312 based on a metric (such as the RSSI) and/or an orientation of wireless communication device 110. Note that the wireless ranging may be performed at or in one or more bands of frequencies, such as at or in: a 2 GHz wireless band, a 5 GHz wireless band, an ISM band, a 60 GHz wireless band, ultra-wide band, etc.

In order to reduce power consumption, wireless communication device 110 and/or physical device 112 may only transmit the unique or the generic identifier(s) or may only attempt to receive the unique or the generic identifier(s) when they are in proximity, such as when they are both in environment 108 in FIG. 1 (and, more generally, when they are within a geo-fenced region) and/or based on a time of an appointment or meeting between users of wireless communication device 110 and/or physical device 112. For example, a Bluetooth low energy receiver may be used to receive a message including an identifier from, e.g., physical device 112. Based on receiving this message, wireless communication device 110 may wake up one or more receivers and initiate wireless ranging, so that wireless communication device 110 can determine a range 310 and/or direction 312 to physical device 112. In some implementations, wireless communication device 110 also may receive a message with a unique identifier from physical device 112.

Next, as described further below with reference to FIGS. 4-10, wireless communication device 110 may present output information that indicates the range and/or the direction to an object, such as physical device 112.

In some embodiments, ambient sound may be used by wireless communication device 110 to determine whether physical device 112 is in the same environment 108 (FIG. 1) as wireless communication device 110, such as the same room (as opposed to an adjacent or neighboring room). For example, the ambient sound recorded by physical device 112, which is shared with wireless communication device 110 via a wireless communication channel (such as a WLAN), may be compared with the ambient sound measured by wireless communication device 110. If the ambient sound measurements compare favorably, wireless communication device 110 and physical device 112 may be determined to be in the same room. Alternatively or additionally, wireless communication device 110 may output one or more acoustic chirps or sounds (which may be at or in a band of frequencies that are outside of the range of human hearing) that can be detected, monitored, and/or recorded by physical device 112.

More generally, one or more measurements performed by wireless communication device 110 may be used to disambiguate one or more potential target devices in environment 108 (FIG. 1), such as distinguishing physical device 112 from one or more other devices/objects. For example, a target device of a user facing the wireless communication device 110 may have the same orientation, a different height, and/or the same or a different RSSI. In conjunction with the identifier and/or the range 310, the one or more measurements may be used to identify physical device 112. Furthermore, as noted previously, a potential target device may be excluded based on the ambient sound, which may indicate that it is in someone's pocket and, thus, is less likely to be of interest for pairing or sharing of information.

Altimeter or angle of arrival information also can be used to exclude potential target devices outside of an area of likely interest, e.g., below a table or in a pocket/bag when they are not likely candidates to be located. In another example, ultrasonic chirps or 60 GHz transmissions can be used to exclude potential target devices within primary radio range or wireless proximity, but that are located outside of a relevant physical space or physical proximity (e.g., the excluded potential target devices may be in a different room).

However, if multiple potential target devices cannot be separated in one or more of these ways, then the user of wireless communication device 110 may be asked to choose among a set of potential target devices that were identified. For example, a user interface with a list of potential target devices may be presented on a display of wireless communication device 110, and a device can be selected through user input.

While physical device 112 is used as an illustrative example in the preceding discussion, in other embodiments the object in environment 108 (FIG. 1) can be a virtual representation, such as virtual representation 114 of physical device 118 in FIG. 1. For example, the virtual representation may be a proxy for the physical device at a predefined physical location (such as physical location 116 in FIG. 1) in a room or an environment 108 in FIG. 1. Note the predefined physical location (and, more generally, a predefined physical location in three-dimensional space) may have been specified by the user through wireless communication device 110, e.g., during a training process, such as by bringing wireless communication device 110 proximate to or touching the physical location and activating a virtual command icon in a user interface displayed on a touch-sensitive display on wireless communication device 110, or by touching wireless communication device 110 to the physical location and verbally stating a command or an instruction that is monitored by wireless communication device 110 and interpreted using a speech-recognition technique.

Figure 4:
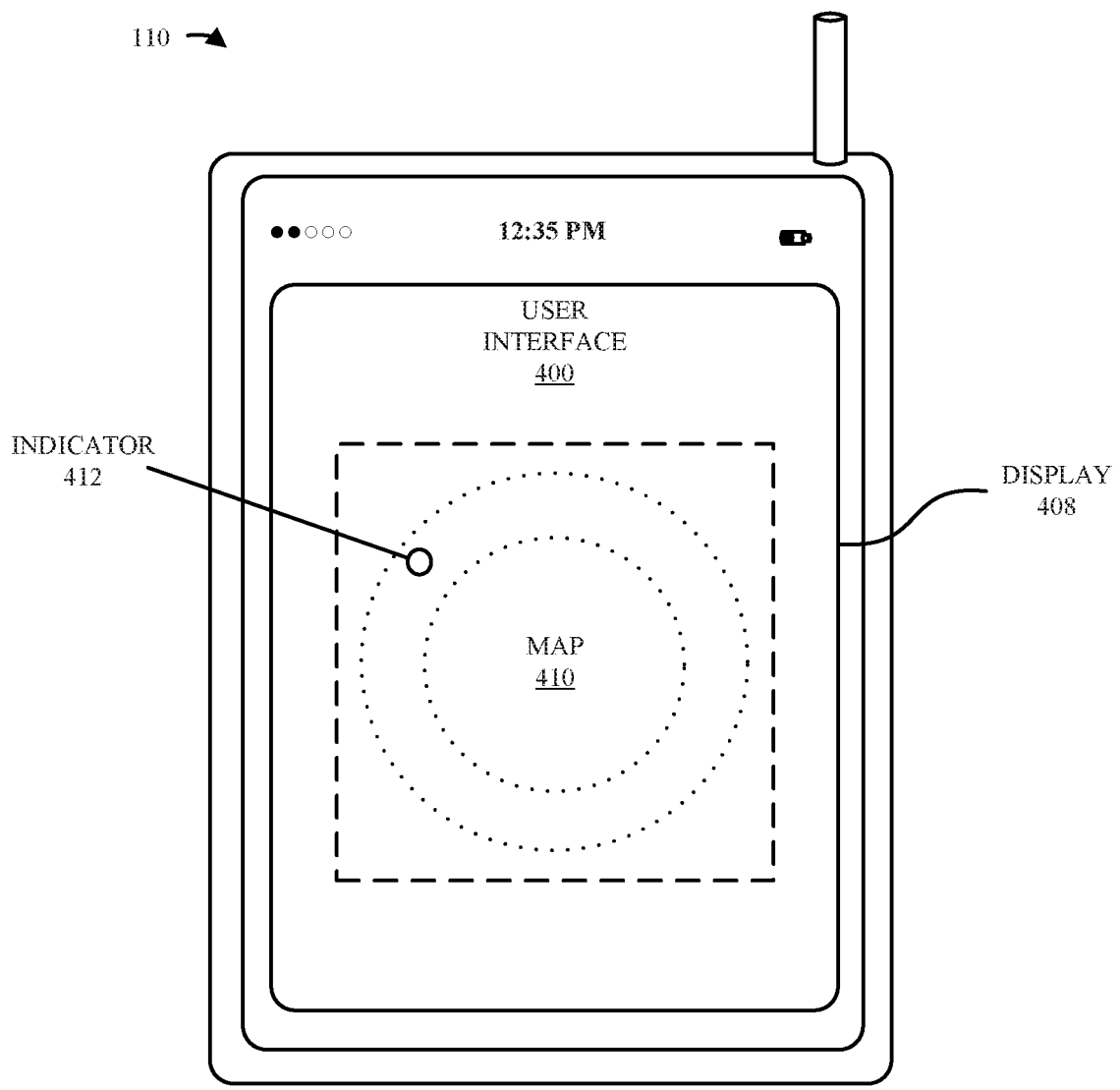
FIG. 4 provides a drawing illustrating an example of a user interface that displays a map and an indicator that represents the object in FIG. 3.

We now describe examples of displayed information that is based on the determined location of an object (such as physical device 112) in an environment. FIG. 4 presents a drawing illustrating an example of a user interface 400 on display 408 that displays a map 410 of a proximate area in the environment (and, more generally, a graphical representation of the environment). When the user holds wireless communication device 110 in the palm of their hand, map 410 may be displayed. The map 410 can include an indicator 412 that represents the position of an object, such as physical device 112. In some implementations, the position of indicator 412 alone can convey the determined range and/or direction to the corresponding object. In some other implementations, additional information signifying the determined range and/or distance also can be presented in conjunction with map 410.

Note that map 410 may provide intuitive situational awareness about objects (such as physical device 112) and their relative location(s) in the environment around wireless communication device 110. For example, the user-interface technique may allow a user to identify the locations of resources in the environment, such as a fire extinguisher, a first-aid kit, an automated external defibrillator, an exit, and/or someone who has medical training. Alternatively or additionally, the user-interface technique may provide dynamic location information about proximate objects, such as when an electronic device ahead on a path of travel experiences an event (e.g., a sudden deceleration). One or more electronic devices proximate to this electronic device, e.g., on the path of travel, may be notified of the event.

Figure 5:
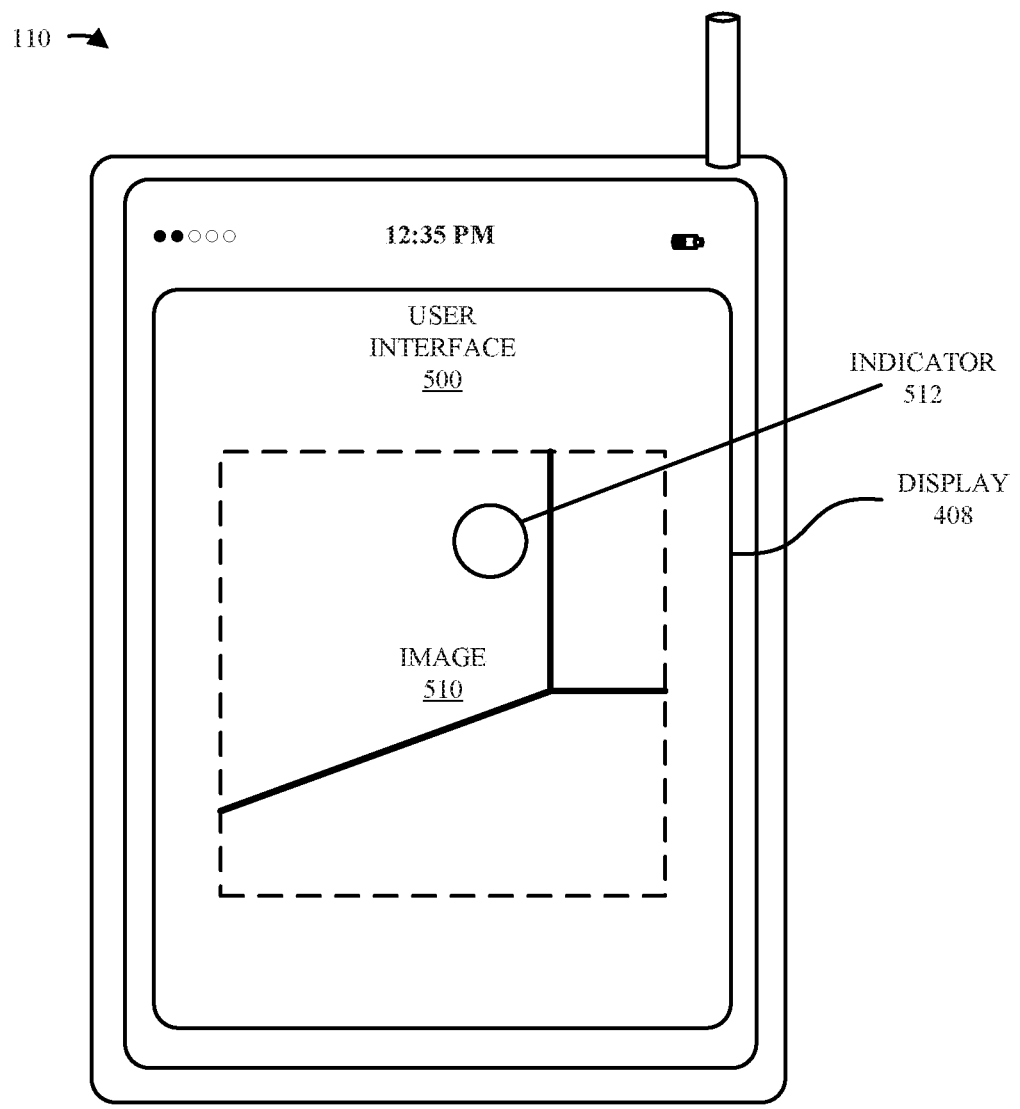
FIG. 5 provides a drawing illustrating an example of a user interface that displays an image and an indicator that represents the object in FIG. 3.

FIG. 5 presents a drawing illustrating an example of a user interface 500. The user interface 500 is presented on display 408 of wireless communication device 110 and may display an image 510 of the proximate area, as captured by an image sensor (such as a CMOS or a CCD imaging sensor and, more generally, a camera) of wireless communication device 110. Wireless communication device 110 also may display an overlaid annotation or indicator 512 (which may be the same as or different than indicator 412 in FIG. 4) on image 510, representative of an object, e.g., physical device 112. The object may have been identified as a result of wireless communication device 110 receiving an identifier in a wireless transmission. Note that indicator 512 (and/or indicator 412 in FIG. 4) may be displayed whether or not the corresponding object is within visual range of, or otherwise visible to, wireless communication device 110. For example, indicator 512 may be presented to help a user of wireless communication device 110 locate an object that is difficult to see or cannot yet be seen.

Consequently, the user-interface technique may include or may use augmented reality. In particular, the location information determined using wireless ranging (such as the range and/or the direction) may be overlaid on images of the surrounding environment. This augmented reality may provide added intelligence to help the user of wireless communication device 110 identify things, locations, resources, and/or people in the vicinity. For example, this approach may be used to assist a user in: locating a person they are meeting (person-based), locating resources such as first aid or wireless coverage (resource-based), and/or finding results of location-based searches, such as buildings or streets (search-based). The display on wireless communication device 110 may include a camera input that is augmented to show items of interest.

Thus, if the user is in a crowded environment and they hold up wireless communication device 110, an image of the person they are looking for may be displayed on an image of the environment when wireless communication device 110 is orientated or directed toward this person (or their associated electronic device, such as physical device 112). Moreover, as described further below with reference to FIG. 11, as the user rotates or turns (e.g., based on the measured orientation of wireless communication device 110), their associated smart watch or other such wearable device may provide haptic feedback, e.g., a 'tap' (or another type of feedback, such as audio output), when they are facing in the correct direction—e.g., the direction of the person, object, or resource for which they are looking. Consequently, the user-interface technique may facilitate social interactions and meetings, even in crowded environments, and even when the user has not previously met the person for whom they are looking.

In some embodiments, wireless communication device 110 automatically toggles or switches between different user-interface modes. This is shown in FIG. 6, which presents a drawing illustrating an example of different modes of a user interface based on an orientation of wireless communication device 110. In particular, as the user of wireless communication device 110 changes the device orientation, a gyroscope or an accelerometer may measure the change in the orientation value. Then, based on the measured orientation value, wireless communication device 110 may selectively transition between displaying map 410 (FIG. 4) and displaying image 510 (FIG. 5). Thus, when wireless communication device 110 is oriented horizontally, e.g., is in the user's palm, a map view 610 showing map 410 (FIG. 4) may be displayed. When wireless communication device 110 is oriented vertically, e.g., faces the direction of physical device 112, a camera view 612 showing image 510 (FIG. 5) may be displayed. Transition between the map view 610 and camera view 612 interface modes can be initiated when one or more sensor inputs indicate an orientation change of more than a threshold amount. Alternatively or additionally, the map view 610 may be displayed when physical device 112 is out of visual range of the user, and a 'camera view' 612 may be displayed when physical device 112 is in visual range. In this way, the user may intuitively toggle or transition between the two user-interface modes by changing an orientation of wireless communication device 110.

Alternatively, in some embodiments the user of wireless communication device 110 can manually select or specify the user-interface mode. This is shown in FIG. 7, which presents a drawing illustrating an example of different modes of a user interface 700. For example, by providing touch input to a touch-sensitive display of wireless communication device 110 within a strike area of a virtual icon 708, the user may select a map view with a map 710 showing, e.g., a 360° perspective around wireless communication device 110. The map 710 can depict one or more objects (such as physical device 112) at different ranges and directions (such as range 712 and direction 714) that are represented by indicators (such as indicator 716), e.g., any/all of text, a thumbnail, symbols, emoticons or graphical icons. Furthermore, the user may select an image view in which an image such as image 510 (FIG. 5) is displayed, and physical device 112 is represented by indicator 512 (e.g., any/all of text, a thumbnail, a symbol, an emoticon or a graphical icon) when wireless communication device 110 is oriented vertically and facing in direction 714 toward physical device 112.

Figure 8:
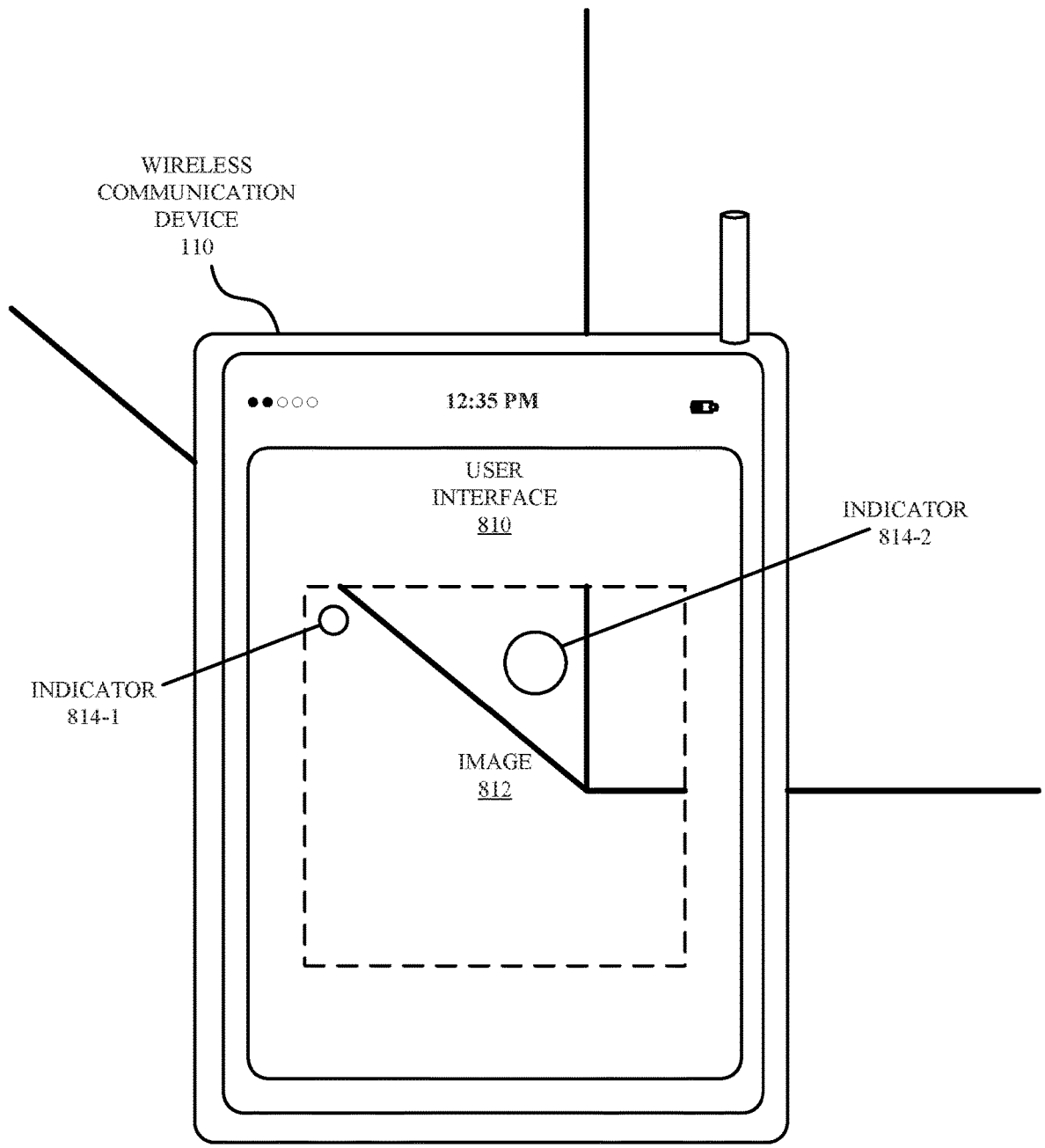
FIG. 8 provides a drawing illustrating an example of augmented reality.

In some embodiments, the user-interface technique can include additional variations on augmented reality. For example, as shown in FIG. 8, which presents a drawing illustrating an example of augmented reality in user interface 810, a front-facing camera on wireless communication device 110 may capture images (or video) of the environment in front of wireless communication device 110. The images (such as image 812) may be displayed on wireless communication device 110 along with one or more indicators 814 that represent objects (such as physical device 112) when wireless communication device 110 is facing the direction of the object(s). As a result, wireless communication device 110 presents the environment before the user in a manner augmented with additional information. Note that indicators 814 may be positioned in the image 812 such that they represent the respective locations of their corresponding objects in environment 108. Further, indicators 814 may be sized to provide a perspective view with intuitive information about the relative ranges to the corresponding objects. Therefore, objects that are farther away from wireless communication device 110 (and, thus, from the user) may be represented by smaller indicators than objects that are nearer to wireless communication device 110.

Figure 9:
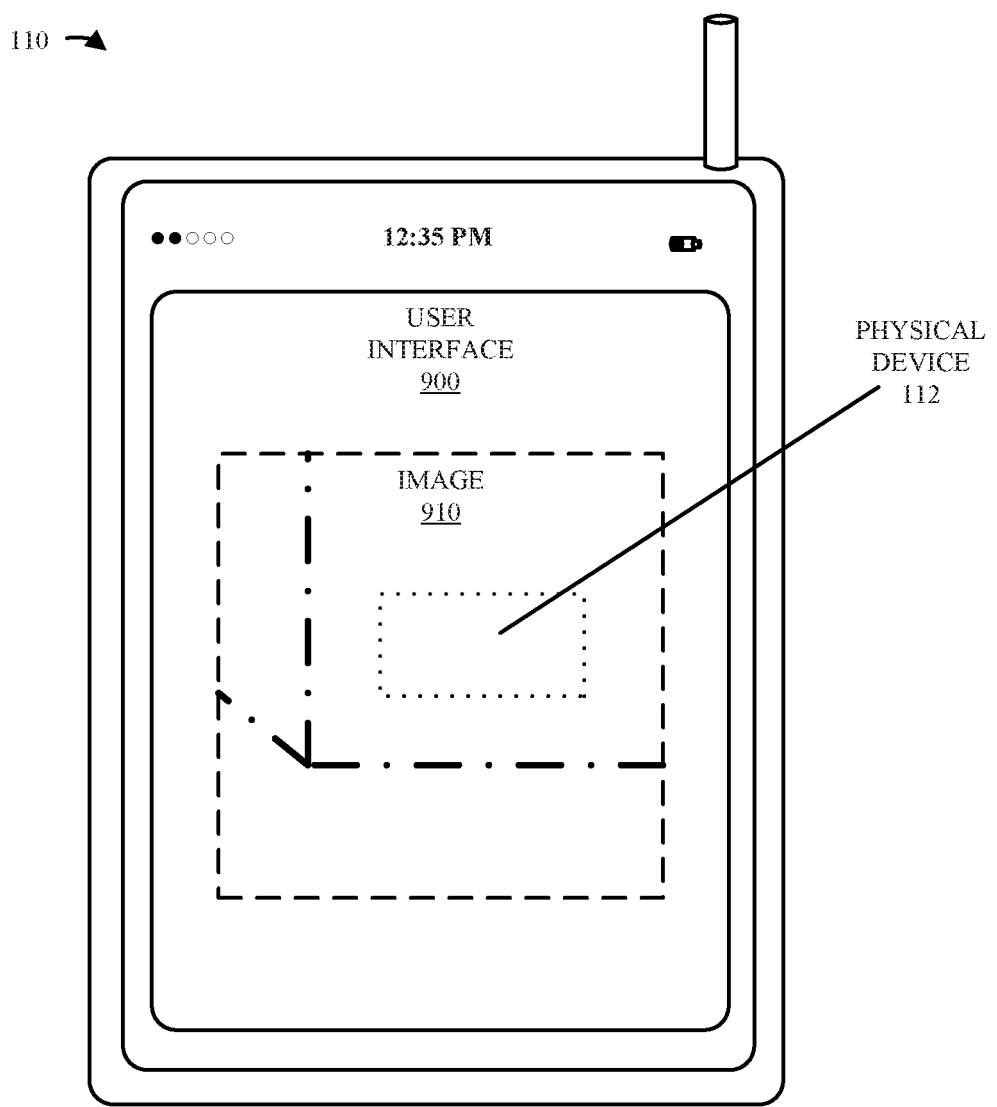
FIG. 9 provides a drawing illustrating an example of expanded situational awareness about resources in an environment.

FIG. 9 presents a drawing illustrating an example of expanded situational awareness regarding objects in an environment, including depicting objects that may be located out of view. In particular, when an object, e.g., physical device 112, is located on the other side of an opaque barrier, such as a wall, one or more images 910 can be displayed in user interface 900 of wireless communication device 110 to allow the user to see physical device 112 as if the opaque barrier were not there (or as if the user could see through the opaque barrier). For example, if the user is looking for a resource (such as a printer) that is in another room, when the user points wireless communication device 110 in the direction of the resource, an image 910 depicting the resource may be displayed in the user interface 900. In some implementations, the image 910 can include additional information regarding the resource, e.g., physical device 112. For example, the additional information can allow the user to, physically or virtually, access the resource.

Thus, the user interface may include instructions (and optionally a map) on how to reach the resource. The display can present a map that indicates where a requested object is located, e.g., based on receiving an identifier from the object and determining a range and/or direction. Alternatively or additionally, location information can be obtained through a search. For example, when a requested object is out of visual range, this approach can be used to guide a user to the object, e.g., showing the way through an airport to ground transport, customs, etc. Similarly, this approach can be used to help a user move through a mall or store, by augmenting the map or display with directions to, e.g., a desired object, resource, or location. Moreover, the augmented-reality approach may annotate areas that have Wi-Fi coverage, such as coverage supplied by a particular carrier or service provider. Note that the augmented information can be applied on an individual basis (e.g., meeting another person for whom a user has identifying information, such as a phone number); on a search basis (e.g., the user searches for and obtains coordinates for a place/thing); on a resource basis (e.g., first aid, security, restrooms may advertise their location, location of a taxi cab or a restaurant), or on a combination thereof.

Alternatively or additionally, by tapping on an icon associated with physical device 112 in user interface 900 displayed on wireless communication device 110, the user may instruct wireless communication device 110 to pair or connect with physical device 112. This intuitive pairing may allow these devices to subsequently communicate with each other. Therefore, a resource, such as a computer in a crowded workspace, can be selected through touch input to user interface 900.

When these operations are performed, wireless communication device 110 and/or physical device 112 may display a message in user interface 900, which allows either or both of the users of wireless communication device 110 and/or physical device 112 to confirm the pairing. In addition, the pairing with physical device 112 may be made for a specified time interval, such as 10 min or an hour, after which the pairing may be broken. In this way, users and/or resources may maintain control of the pairing process, which also may help ensure that the pairing is secure, by confirming that the pairing is with a physical device that is in the same environment (such as the same room). In this way, the user may avoid inadvertently pairing with a nearby device that is spoofing or otherwise impersonating a different device. This approach may also help to reduce the complexity of sharing information and/or pairing. For example, passwords may not be needed during the pairing process. In some embodiments, after the aforementioned virtual paring operation, devices such as wireless communication device 110 and physical device 112 can exchange encryption keys.

In another example, wireless communication device 110 can be pointed in the direction of an object with which to pair. The camera of wireless communication device 110 may capture an image of all objects in that direction and may provide a selectable on-screen indicator showing the pairing candidates. For example, the objects can be determined based at least in part on associated wirelessly transmitted identifiers and one or more ranging operations. The user can then select, using the on-screen indicator, the item (and protocol) with which to pair.

Figure 10:
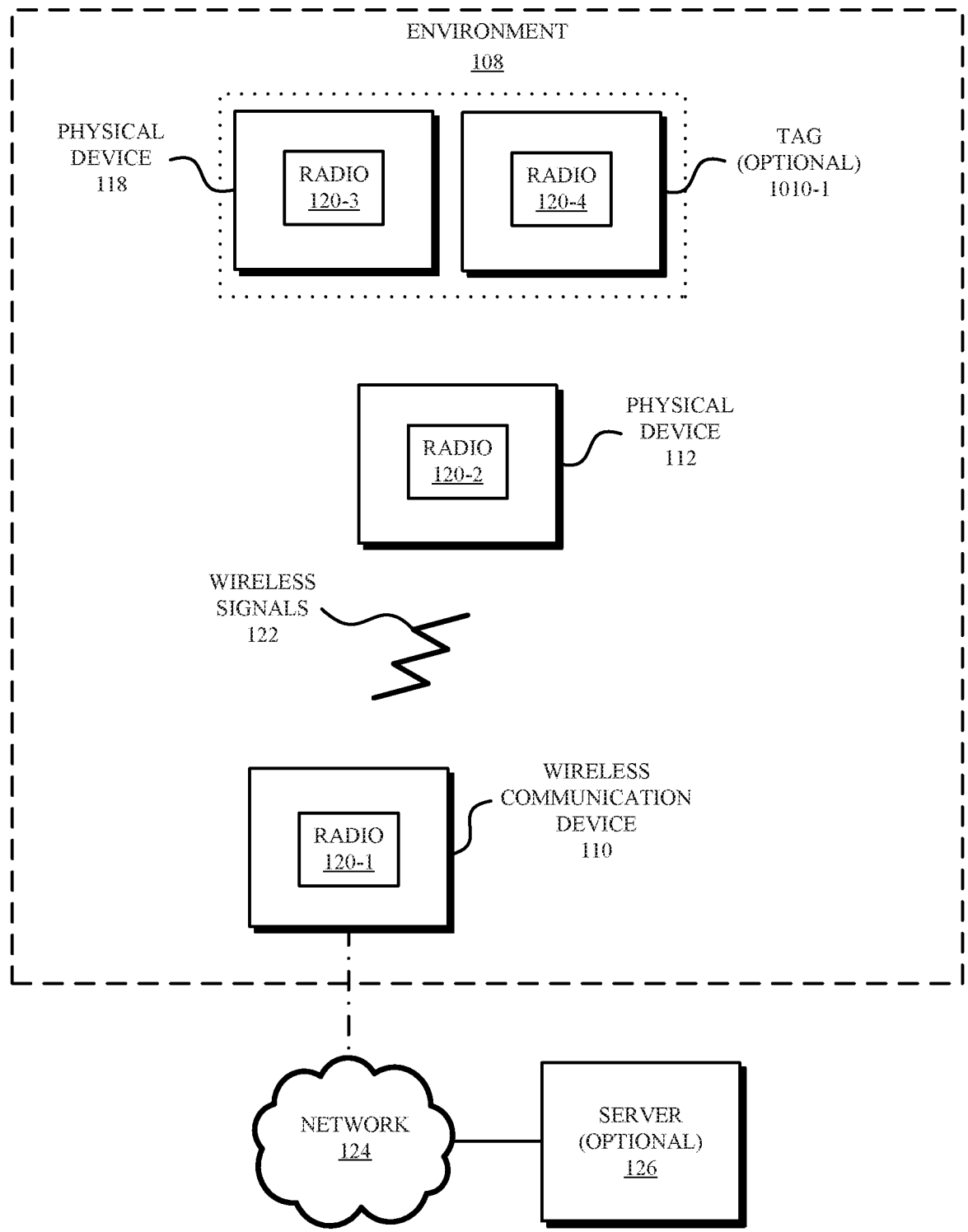
FIG. 10 provides a drawing illustrating an example of providing reminders and tracking objects in an environment.

As shown in FIG. 10, the user-interface technique may also be used to provide reminders and/or to track objects in an environment. For example, the user-interface technique may allow a user to track the location of objects (such as physical device 112) in the environment or to obtain reminders about groups of related objects in the environment. In this manner, a parent may keep track of a child or a person may make sure not to forget one or more objects.

In some embodiments, the user bundles a group of tagged, related items (such as a tent and the associated tent poles). Feedback, such as an alert, is provided to the user if all the items are not present in the group, e.g., if the user forgets an item. Furthermore, the user-interface technique may be used to track items tagged with a unique identifier. For example, a camera can be configured to track a child on stage during a performance. Similarly, the user-interface technique may be used to remind a user not to leave tracked/tagged items as a user departs an area. For example, a reminder can be issued if an umbrella is more than a threshold distance away. Further, the techniques can be used to track the location/movement of items in an area, to track users for gaming purposes (e.g., virtual paintball), etc. For example, if the user moves more than a predefined distance from a tagged item, they may receive a reminder. More generally, the techniques may involve the use of augmented reality to remind the user about things they see or things they need to do, such as names, errands, etc.

As noted previously, reminder functionality may be facilitated by one or more optional tags, such as optional tag 1010, in environment 108 that is included in or proximate to an object of interest (such as physical device 118). In particular, optional tag 1010 may harvest power over the air (e.g., it may receive signals at 24 GHz) and may communicate through a chirp or a short transmission (e.g., at 60 GHz). This communication may have a range of up to, e.g., 100 ft., and may be directional. The 24 GHz power signal also may include an identifier encoded on the signal. If optional tag 1010 does not recognize the signal, it may not respond. The time duration for optional tag 1010 to respond to a start pulse (e.g., once it has indicated it is powered and operational) may be known. Note that wireless communication device 110 receiving a signal from tag 1010 may measure the phase and angle of arrival to determine a measure of direction, and may use the time of arrival or the time of flight, based on the known response time, to determine the range between wireless communication device 110 and the tag 1010.

A wide variety of feedback may be provided to the user or other individuals in the environment using the user-interface technique. This is shown in FIG. 11, which presents a drawing illustrating an example of different types of feedback associated with a user interface. In particular, in addition to the visual display of the determined location information, wireless communication device 110 may provide other types of feedback to a user. For example, wireless communication device 110 may provide haptic feedback, either directly through wireless communication device 110 or indirectly through another electronic device (such as the user's smart watch). In particular, wireless communication device 110 may instruct smart watch 1110 to provide haptic feedback via transducer (trans.) 1112. In this way, the user may receive feedback when they are facing in the direction of an object being sought, such as physical device 112.

Additionally, wireless communication device 110 may transmit a message to physical device 112, such as a text or an audio message. For example, the message may include an audio message that is transmitted as a beam-formed audio message 1114 that is perceivable substantially only in a location corresponding to physical device 112. In this way, the user of wireless communication device 110 can send a private message to another individual within range (such as a person they can see), even when the user does not have conventional contact information (such as a telephone number or email address) for an electronic device associated with that person. For example, the message can be directed to the target device based on an identifier (e.g., an anonymous identifier) received from the target device, e.g., in an advertising beacon. As a result, this directional communication may be anonymous. In some embodiments, the beam-formed audio 1114 message can be transmitted via the infrastructure in a building or structure.

Alternatively or additionally, wireless communication device 110 may transmit a beam-formed audio message to the user of wireless communication device 110 with useful information, such as: the names of people in the environment, an errand to run, an upcoming appointment, etc. Thus, augmented reality can be implemented using directional communication to remind the user of things in the environment, e.g., through visual queues and beam-formed audio messages that can be perceived only by the user of wireless communication device 110.

Note that haptic feedback and/or the messages can enhance a searching function by confirming directionality, e.g., when wireless communication device 110 is pointed in the right direction, wireless communication device 110 may emit a buzz and/or beep. Alternatively or additionally, the haptic feedback may come from a second device, e.g., an associated smart watch. The second device can output haptic feedback to notify the user of a condition or an event, such as when wireless communication device 110 is pointed in the direction of a resource being sought; a hailed vehicle is approaching; in order to highlight signs/addresses that are difficult to see; to indicate a bus/train is the one the user needs, is going where the user wants to go, etc.

In some embodiments, the user-interface technique is used to provide additional features such as: location-based anonymous chat rooms; an electronic assistant that can respond to searches or read emails so that only the device user can perceive (e.g., hear) the responses; to determine if a user has a friend in a room; etc.

Figure 12:
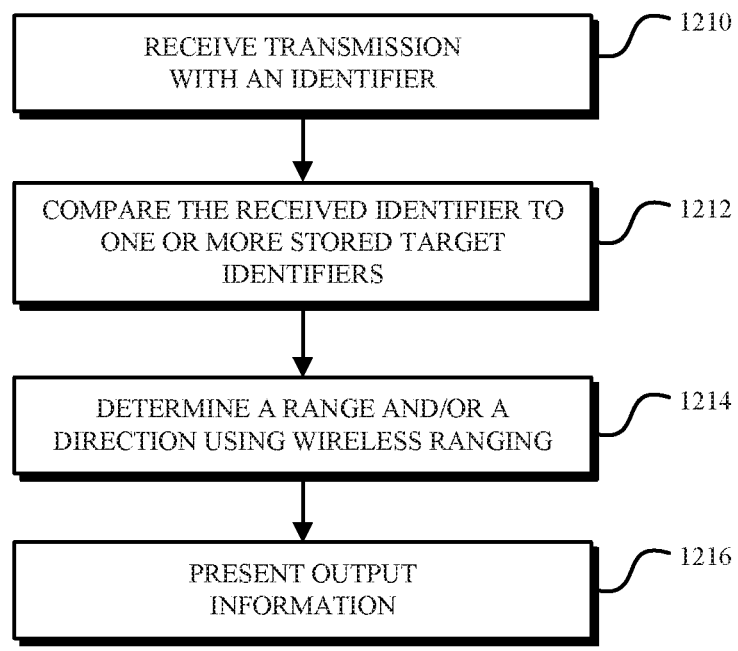
FIG. 12 provides an example of a method for locating an object using a wireless communication device.

FIG. 12 is a flow diagram illustrating an example of a method 1200 for locating an object using a wireless communication device, such as wireless communication device 110 in FIG. 1. During operation, the wireless communication device receives a transmission with an identifier (operation 1210) associated with the object located proximate to the wireless communication device. In some embodiments, the wireless communication device optionally compares the received identifier (operation 1212) with one or more stored target identifiers to determine whether a match exists.

The wireless communication device determines a range and/or direction to the object (operation 1214) from the wireless communication device. The range, the direction, or both are determined, at least in part, using one or more wireless ranging techniques. Next, the wireless communication device presents output information (operation 1216) that indicates the range and/or the direction of the object from the wireless communication device. For example, the wireless communication device may: display a map with a first indicator representing the object or display an image with a second indicator representing the object. In some implementations, the wireless communication device may transmit a message to the object, e.g., using the identifier included in the transmission from the object.

In some embodiments of method 1200, there may be additional or fewer operations. For example, in some embodiments the wireless communication device does not receive the transmission with the identifier (operation 1210). Furthermore, the order of the operations may be changed, and/or two or more operations may be combined into a single operation or may be performed in parallel.

Figure 13:
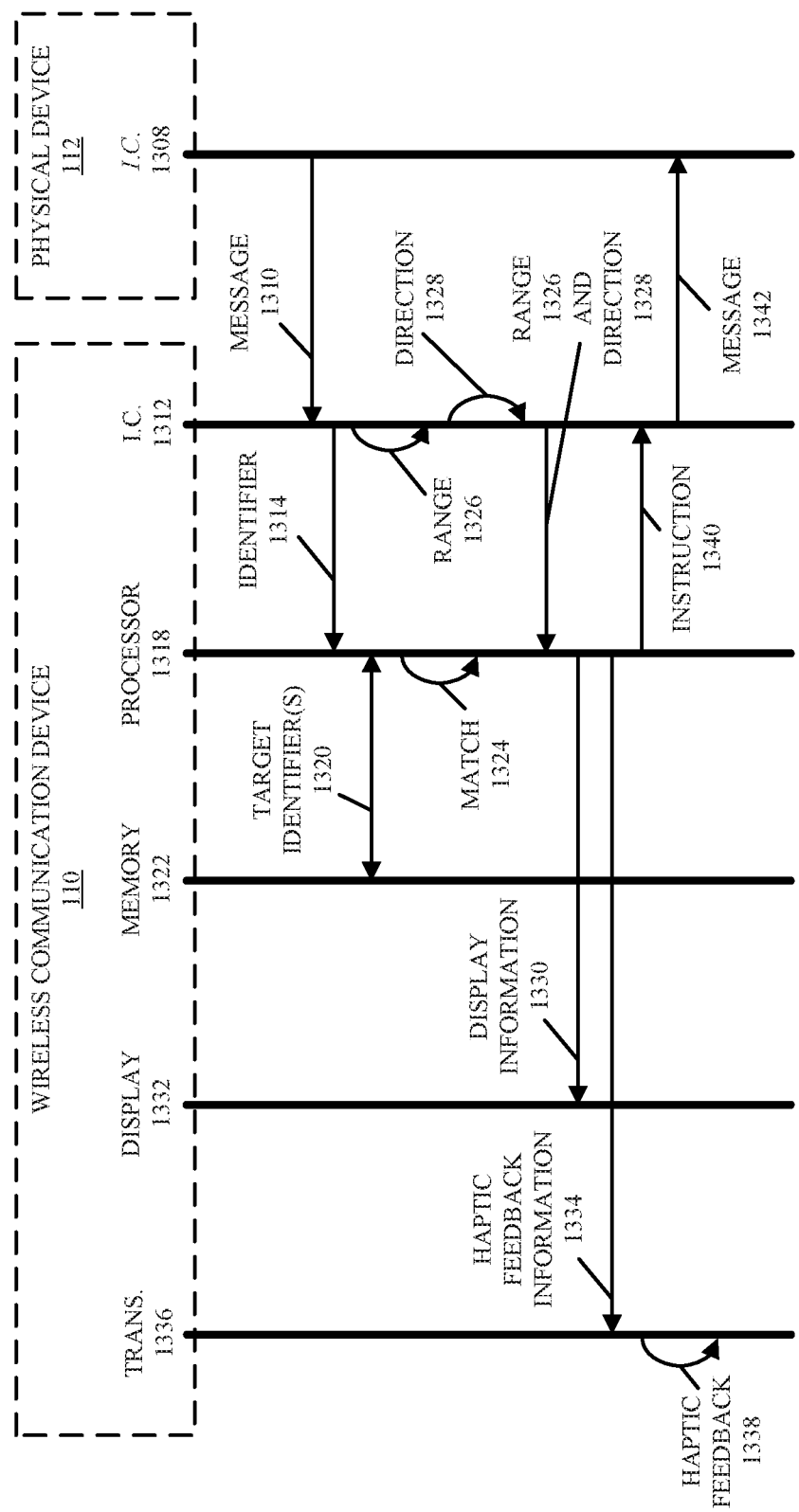
FIG. 13 provides an example of communication among the electronic devices in FIG. 1.

Embodiments of the user-interface technique are further illustrated in FIG. 13, which presents a drawing illustrating communication between wireless communication device 110 and physical device 112 (which is used as an illustrative example). Interface circuit (I.C.) 1312 in wireless communication device 110 may receive a message 1310 from interface circuit 1308 in physical device 112. This message may include an identifier 1314 associated with physical device 112 and/or a user of physical device 112. The identifier 1314 is provided to processor 1318. In some embodiments, processor 1318 optionally accesses one or more stored target identifiers 1320 in memory 1322, and optionally compares identifier 1314 with the one or more stored target identifiers 1320 to determine whether a match 1324 exists.

Then, interface circuit 1312 may determine a range 1326 and/or a direction 1328 from physical device 112 using one or more wireless ranging and/or angle of arrival techniques. The range 1326 and direction 1328 are provided to processor 1318.

Next, processor 1318 may present output information that indicates range 1326 and/or direction 1328. For example, processor 1318 may display information 1330 on or provide display instructions to display 1332, such as a map with a first indicator representing physical device 112 or an image with a second indicator representing physical device 112. Alternatively or additionally, processor 1318 may optionally provide another type of feedback, such as by sending haptic feedback information 1334 to transducer 1336 to generate haptic feedback 1338. In some embodiments, processor 1318 provides one or more instructions 1340 to interface circuit 1312, which transmits, based on identifier 1314, a message 1342 (e.g., a text message) to physical device 112. The message 1342 can include one or more items of information, including either or both of range 1326 and/or direction 1328.

Representative Embodiments

In some embodiments, a wireless communication device implemented method for locating an object includes the wireless communication device: (i) receiving a transmission including an anonymous identifier associated with an object located proximate to the wireless communication device; (ii) determining a range and a direction of the object from the wireless communication device, where the range and the direction are determined, at least in part, using a wireless ranging operation; and (iii) presenting output information that indicates a location of the object based at least in part on the range and the direction.

In some embodiments, presenting the output information includes: displaying, on a display of the wireless communication device, a map of a proximate area; and displaying, on the map, an indicator representing the location of the object. In some embodiments, the indicator is displayed whether or not the object is within visual range of the wireless communication device. In some embodiments, presenting the output information includes: displaying, on a display of the wireless communication device, an image of a proximate area captured by an image sensor of the wireless communication device; and displaying, on the image, an indicator representing the location of the object. In some embodiments, the indicator is displayed whether or not the object is within visual range of the wireless communication device. In some embodiments, the anonymous identifier associated with the object includes a transient identifier. In some embodiments, the anonymous identifier associated with the object identifies a resource class corresponding to the object. In some embodiments, the method further includes comparing the received anonymous identifier with one or more stored target identifiers to determine a match. In some embodiments, the one or more stored target identifiers were received in conjunction with a search result. In some embodiments, at least one of the one or more stored target identifiers corresponds to a contact stored at the wireless communication device. In some embodiments, presenting the output information further includes: transitioning, based on an orientation of the wireless communication device, between displaying a map of a proximate area including a first indicator representative of the object and displaying a camera-captured image of the proximate area including a second indicator corresponding to the object. In some embodiments, the indicator is sized in accordance with the range. In some embodiments, the method further includes transmitting a message to the object using the anonymous identifier. In some embodiments, the message includes an audio message that is transmitted as a beam-formed audio message perceivable substantially only in a location corresponding to the object, the location being determined based, at least in part, on the range and the direction. In some embodiments, the output information includes a haptic output. In some embodiments, the haptic output is presented by a device associated with the wireless communication device.

In some embodiments, a wireless communication device includes: (i) an interface circuit configured to communicate wirelessly with an object using at least one wireless communication protocol; (ii) a processor, communicatively coupled to the interface circuit, configured to execute a program module; and (iii) a memory, communicatively coupled to the processor, configured to store the program module, the program module including instructions for: receiving, via the interface circuit, a transmission includes an anonymous identifier associated with an object located proximate to the wireless communication device; determining, via the interface circuit, a range and a direction of the object from the wireless communication device, where the range and the direction are determined, at least in part, using a wireless ranging operation; and presenting output information indicating the range and the direction of the object from the wireless communication device.

In some embodiments, the instructions for presenting output information further include instructions for presenting a map including a location indicator representative of the object.

In some embodiments, a computer-program product, for use in conjunction with a wireless communication device, includes a non-transitory computer-readable storage medium and a computer-program mechanism embedded therein to locate an object, the computer-program mechanism including: (i) instructions for receiving, by the wireless communication device, a transmission includes an anonymous identifier associated with an object located proximate to the wireless communication device; (ii) instructions for determining, by the wireless communication device, a range and a direction of the object from the wireless communication device, where the range and the direction are determined, at least in part, using a wireless ranging operation; and (iii) instructions for presenting output information indicating the range and the direction of the object from the wireless communication device.

In some embodiments, the instructions for presenting further includes instructions for: transitioning, based on an orientation of the wireless communication device, between displaying a map of a proximate area including a first indicator representative of the object and displaying a camera-captured image of the proximate area including a second indicator corresponding to the object.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A wireless communication device implemented method for locating an object, comprising:
by the wireless communication device operated by a user:
receiving a transmission comprising an anonymous identifier associated with an object located proximate to the wireless communication device in a wireless personal area network (WPAN) or a wireless local area network (WLAN), the transmission transmitted from the object to the wireless communication device using a WPAN communication protocol or a WLAN communication protocol;
determining a range and a direction of the object from the wireless communication device, wherein the range and the direction are determined, at least in part, using a wireless ranging operation that is initiated in response to receiving the transmission; and
presenting output information that indicates a location of the object based at least in part on the range and the direction.

2. The method of claim 1, wherein presenting the output information comprises:
displaying, on a display of the wireless communication device, a map of a proximate area; and
displaying, on the map, an indicator representing the location of the object.

3. The method of claim 2, wherein the indicator is displayed whether or not the object is within visual range of the wireless communication device.

4. The method of claim 1, wherein presenting the output information comprises:
displaying, on a display of the wireless communication device, an image of a proximate area captured by an image sensor of the wireless communication device; and
displaying, on the image, an indicator representing the location of the object.

5. The method of claim 4, wherein the indicator is displayed whether or not the object is within visual range of the wireless communication device.

6. The method of claim 1, wherein the anonymous identifier associated with the object comprises a transient identifier.

7. The method of claim 1, wherein the anonymous identifier associated with the object identifies a resource class corresponding to the object.

8. The method of claim 1, further comprising:
comparing the received anonymous identifier with one or more stored target identifiers to determine a match;
wherein the anonymous identifier is different from a telephone number or an email address, and at least one of the one or more stored target identifiers was received in conjunction with a search result or financial transaction, or corresponds to a contact stored at the wireless communication device.

9. The method of claim 1, wherein presenting the output information further comprises:
transitioning, based on an orientation of the wireless communication device, between displaying a map of a proximate area including a first indicator representative of the object and displaying a camera-captured image of the proximate area including a second indicator corresponding to the object.

10. The method of claim 9, wherein the first indicator or the second indicator is sized in accordance with the range.

11. The method of claim 1, further comprising:
transmitting a message to the object using the anonymous identifier wherein the anonymous identifier is different from a telephone number or an email address.

12. The method of claim 11, wherein the message comprises an audio message that is transmitted as a beamformed audio message perceivable substantially only in a location corresponding to the object, the location being determined based, at least in part, on the range and the direction.

13. The method of claim 1, wherein the output information comprises a haptic output.

14. The method of claim 13, wherein the haptic output is presented by a device associated with the wireless communication device.

15. A wireless communication device operated by a user, comprising:
an interface circuit configured to communicate wirelessly with an object using at least one wireless communication protocol;
a processor, communicatively coupled to the interface circuit, configured to execute a program module; and
a memory, communicatively coupled to the processor, configured to store the program module, wherein the program module includes instructions for:
receiving, via the interface circuit, a transmission comprising an anonymous identifier associated with an object located proximate to the wireless communication device in a wireless personal area network (WPAN) or a wireless local area network (WLAN), the transmission transmitted from the object to the wireless communication device using a WPAN communication protocol or a WLAN communication protocol;
determining, via the interface circuit, a range and a direction of the object from the wireless communication device, wherein the range and the direction are determined, at least in part, using a wireless ranging operation that is initiated in response to receiving the transmission; and
presenting output information indicating the range and the direction of the object from the wireless communication device.

16. The wireless communication device of claim 15, wherein the instructions for presenting output information further comprise instructions for presenting a map including a location indicator representative of the object.

17. The wireless communication device of claim 15, further comprising:
comparing the received anonymous identifier with one or more stored target identifiers to determine a match;
wherein the anonymous identifier is different from a telephone number or an email address, and at least one of the one or more stored target identifiers was received in conjunction with a search result or financial transaction, or corresponds to a contact stored at the wireless communication device.

18. A computer-program product for use in conjunction with a wireless communication device operated by a user, the computer-program product comprising a non-transitory computer-readable storage medium and a computer-program mechanism embedded therein to locate an object, the computer-program mechanism including:
instructions for receiving, by the wireless communication device, a transmission comprising an anonymous identifier associated with an object located proximate to the wireless communication device in a wireless personal area network (WPAN) or a wireless local area network (WLAN), the transmission transmitted from the object to the wireless communication device using a WPAN communication protocol or a WLAN communication protocol;
instructions for determining, by the wireless communication device, a range and a direction of the object from the wireless communication device, wherein the range and the direction are determined, at least in part, using a wireless ranging operation that is initiated in response to receiving the transmission; and
instructions for presenting output information indicating the range and the direction of the object from the wireless communication device.

19. The computer-program product of claim 18, wherein the instructions for presenting further comprises instructions for:
transitioning, based on an orientation of the wireless communication device, between displaying a map of a proximate area including a first indicator representative of the object and displaying a camera-captured image of the proximate area including a second indicator corresponding to the object.

20. The computer-program product of claim 18, further comprising:
comparing the received anonymous identifier with one or more stored target identifiers to determine a match;
wherein the anonymous identifier is different from a telephone number or an email address, and at least one of the one or more stored target identifiers was received in conjunction with a search result or financial transaction, or corresponds to a contact stored at the wireless communication device.

* * * * *